United States Patent
Kotake

(10) Patent No.: US 11,341,770 B2
(45) Date of Patent: May 24, 2022

(54) FACIAL IMAGE IDENTIFICATION SYSTEM, IDENTIFIER GENERATION DEVICE, IDENTIFICATION DEVICE, IMAGE IDENTIFICATION SYSTEM, AND IDENTIFICATION SYSTEM

(71) Applicant: OMRON Corporation, Kyoto (JP)

(72) Inventor: Yasuyo Kotake, Tokyo (JP)

(73) Assignee: OMRON Corporation, Kyoto (JP)

( * ) Notice: Subject to any disclaimer, the term of this patent is extended or adjusted under 35 U.S.C. 154(b) by 147 days.

(21) Appl. No.: 16/976,465

(22) PCT Filed: Mar. 13, 2019

(86) PCT No.: PCT/JP2019/010184
§ 371 (c)(1),
(2) Date: Aug. 27, 2020

(87) PCT Pub. No.: WO2019/176994
PCT Pub. Date: Sep. 19, 2019

(65) Prior Publication Data
US 2021/0117651 A1    Apr. 22, 2021

(30) Foreign Application Priority Data
Mar. 14, 2018 (JP) .............................. JP2018-047259

(51) Int. Cl.
*G06V 40/16* (2022.01)
*G06N 20/00* (2019.01)

(52) U.S. Cl.
CPC .......... *G06V 40/169* (2022.01); *G06N 20/00* (2019.01); *G06V 40/166* (2022.01)

(58) Field of Classification Search
CPC .. G06V 40/169; G06V 40/166; G06V 40/171; G06V 40/174; G06N 20/00;
(Continued)

(56) References Cited

U.S. PATENT DOCUMENTS 10,353,954 B2 * 7/2019 Matsushita ........... G06F 16/784
2010/0316265 A1 * 12/2010 Nakanowatari ...... G06V 40/172
382/118
(Continued)

FOREIGN PATENT DOCUMENTS

CN    104036247    9/2014
JP    2005275605    10/2005
(Continued)

OTHER PUBLICATIONS

"International Search Report (Form PCT/ISA/210) of PCT/JP2019/010184," dated Jun. 18, 2019, with English translation thereof, pp. 1-2.
(Continued)

*Primary Examiner* — Lewis G West
(74) *Attorney, Agent, or Firm* — JCIPRNET

(57) ABSTRACT

A facial image identification system is provided to calculate a first feature amount related to each of features from first facial image data used in machine learning for constructing a first identifier that identifies the features of a face, calculate a second feature amount related to each feature from second facial image data obtained in the environment using the first identifier, and compare the first and the second feature amounts for each feature. The system extracts a feature having a large difference between the first and the second feature amounts as a difference feature, and constructs, by implementing machine learning that third facial image data is used, a second identifier for identifying the difference feature and/or a difference-related feature. The third facial image data is acquired in the environment that uses the first identifier and reflects the difference feature and/or the difference-related feature in the third facial image data.

17 Claims, 9 Drawing Sheets

(58) Field of Classification Search
CPC ...... G06N 3/08; G06K 9/6269; G06K 9/6274; G06T 7/00
See application file for complete search history.

(56) References Cited

U.S. PATENT DOCUMENTS

| | | | | |
|---|---|---|---|---|
| 2011/0026810 | A1* | 2/2011 | Hu | G06V 30/242 |
| | | | | 382/190 |
| 2017/0300569 | A1* | 10/2017 | Shiiyama | G06F 16/7867 |
| 2018/0114057 | A1* | 4/2018 | Kim | G06K 9/624 |
| 2018/0157939 | A1* | 6/2018 | Butt | G06K 9/6201 |
| 2018/0341803 | A1* | 11/2018 | Matsushita | G06V 10/255 |
| 2019/0163959 | A1* | 5/2019 | Zhou | G06T 7/12 |
| 2021/0097261 | A1* | 4/2021 | Kapinos | G06V 40/50 |
| 2021/0117651 | A1* | 4/2021 | Kotake | G06T 7/00 |
| 2021/0312164 | A1* | 10/2021 | Kawase | G06V 40/103 |
| 2022/0036581 | A1* | 2/2022 | Morishita | G06V 40/171 |

FOREIGN PATENT DOCUMENTS

| | | |
|---|---|---|
| JP | 2013196046 | 9/2013 |
| JP | 2016191975 | 11/2016 |

OTHER PUBLICATIONS

"Written Opinion of the International Searching Authority (Form PCT/ISA/237) of PCT/JP2019/010184," dated Jun. 18, 2019, with English translation thereof, pp. 1-8.

* cited by examiner

FACIAL IMAGE IDENTIFICATION SYSTEM, IDENTIFIER GENERATION DEVICE, IDENTIFICATION DEVICE, IMAGE IDENTIFICATION SYSTEM, AND IDENTIFICATION SYSTEM

CROSS-REFERENCE TO RELATED APPLICATION

This application is a 371 application of the International PCT application serial no. PCT/JP2019/010184, filed on Mar. 13, 2019, which claims the priority benefit of Japanese Patent Application No. 2018-047259, filed on Mar. 14, 2018. The entirety of each of the above-mentioned patent applications is hereby incorporated by reference herein and made a part of this specification.

BACKGROUND

Technical Field

The present invention relates to a facial image identification system, an identifier generation device, an identification device, an image identification system, and an identification system.

Related Art

In recent years, a technology of acquiring an image of a face (hereinafter, also referred to as "facial image") and identifying facial features from the acquired facial image has been used in various fields. For example, in Patent Literature 1, an authentication device has been proposed which authenticates a user by extracting facial features from a facial image of the user and determining, by an identifier, whether the extracted facial features match the facial features stored in a storage device.

LITERATURE OF RELATED ART

Patent Literature

Patent Literature 1: Japanese Patent Application Laid-Open No. 2013-196046

SUMMARY

Problems to be Solved

The inventor of the present invention has found that the conventional technology for identifying facial features from facial image data by using an identifier has the following problems. That is, the identifier is constructed to collect facial image data in advance and identify facial features from the collected facial image data. However, the identifier is not always used in the same environment as the facial image data used to construct the identifier. In addition, the facial features may differ greatly depending on the environment such as gender, region, photographing device, and brightness of photographing place.

Therefore, when the facial features appearing in the facial image data used to construct the identifier differ greatly from the facial features appearing in the facial image data obtained in the environment in which the identifier is used, the precision of identifying the facial features by the identifier becomes very poor. For example, Asian facial features and Western facial features may differ greatly in terms of eye shape, nose size, and the like. Therefore, it is highly possible that an identifier constructed to identify facial features of Asians cannot correctly identify facial features of Westerners. That is, there is a possibility that the precision of the identifier may decrease according to environmental changes.

Therefore, it is considered to prepare different identifiers according to each environment. If an identifier is prepared for each environment, facial features can be identified without being affected by changes in the environment. However, in this method, different identifiers are prepared according to the environment, and the cost is increased correspondingly. Therefore, the inventor of the present invention has found that the conventional technology has a problem that it is not possible to suppress, with a low cost method, the deterioration of the performance of the identifier caused by the environmental changes.

Moreover, this problem is not peculiar to facial image analysis. Similar problems may occur in any scene in which an identifier is generated from data collected in advance, such as a scene in which some feature is identified from image data other than a facial image, a scene in which some feature is identified from data other than image data, and other scenes. That is, when the feature appearing in the data used to generate the identifier differs greatly from the feature appearing in the data obtained in the environment in which the identifier is used, the identification performance of the identifier in this environment may deteriorate. When a separate identifier to be used in this environment is generated in order to cope with this problem, new data is collected and the separate identifier is generated based on the collected data, leading to an increase in the cost correspondingly.

The present invention has been made in view of the above circumstances in one aspect, and an objective thereof is to provide a technology that suppresses, with a low cost method, deterioration in the identification performance of an identifier caused by environmental changes.

Means to Solve Problems

The present invention adopts the following configurations in order to solve the problems described above.

That is, the facial image identification system according to one aspect of the present invention includes: a first feature amount acquisition unit, which acquires a first feature amount related to each feature and calculated from first facial image data used in machine learning for constructing a first identifier so as to identify a plurality of features of a face; a second feature amount acquisition unit, which acquires a second feature amount related to each feature and calculated from second facial image data in which the plurality of features of the face is reflected, wherein the second facial image data is acquired in an environment in which the first identifier is used and the second facial image data is the same type as the first facial image data; a difference extraction unit, which compares the first feature amount and the second feature amount for each of the features and extracts, based on the result of the comparison and among the plurality of features, a feature having a size in which the difference between the first feature amount and the second feature amount satisfies a predetermined condition as a difference feature; a learning data acquisition unit, which acquires third facial image data in the environment in which the first identifier is used, wherein at least one of the difference feature and a difference-related feature that is a feature related to the difference feature is reflected in the third facial image data; a learning processing unit, which constructs, by machine learning in which the third facial image data is used, a second identifier that identifies at least one of the difference feature and the difference-related feature from the third facial image data; a target data acquisition unit, which acquires target facial image data that is a target for identifying the plurality of features; a first identification unit, which inputs the acquired target facial image data to the first identifier, and thereby acquires, from the first identifier, an output corresponding to the result obtained by identifying the plurality of features from the target facial image data; a second identification unit, which inputs the acquired target facial image data to the second identifier, and thereby acquires, from the second identifier, an output corresponding to the result obtained by identifying at least one of the difference feature and the difference-related feature from the target facial image data; and an output unit, which outputs, based on the output of the first identifier and the output of the second identifier, the result obtained by identifying the plurality of features from the target facial image data.

In the facial image identification system having the above configuration, the first feature amount related to each feature and calculated from the first facial image data used in machine learning for constructing a first identifier that identifies a plurality of features of a face is acquired. In addition, the facial image identification system acquires the second feature amount related to each feature and calculated from the second facial image data obtained in the environment in which the first identifier is used. Then, the facial image identification system compares the first feature amount and the second feature amount for each feature. As a result of this comparison, the feature in which the difference between the first feature amount and the second feature amount is determined to exceed a predetermined criterion corresponds to the facial feature that greatly differs in the environment in which the first facial image data used for the construction of the first identifier and the environment in which the second facial image data is collected and the first identifier is used. That is, by comparing the first feature amount and the second feature amount, it is possible to find a facial feature that may greatly differ due to environmental changes.

Therefore, in the facial image identification system having the above configuration, a feature determined to have a large difference between the first feature amount and the second feature amount according to a predetermined criterion is extracted as the difference feature. Then, the facial image identification system acquires, in the environment in which the first identifier is used, the third facial image data in which at least one of the extracted difference feature and the difference-related feature that is a feature related to the difference feature is reflected, and constructs the second identifier for identifying at least one of the difference feature and the difference-related feature by implementing machine learning in which the acquired third facial image data is used. Thereby, the facial image identification system can use the first identifier to identify a plurality of features of the face and use the second identifier to identify at least one of the difference feature and the difference-related feature that may not be accurately identified by the first identifier. That is, the facial image identification system can, for example, overwrite the identification result of the difference feature obtained by the first identifier with the identification result of the difference feature obtained by the second identifier, or the identifier to be used can be switched according to the feature to be identified so that the first identifier is used to identify the facial feature other than the difference feature and the second identifier is used to identify the difference feature of the face. In addition, the facial image identification system can, for example, supplement the difference-related identification result obtained by the first identifier with the identification result of difference-related feature obtained by the second identifier.

Therefore, according to the above configuration, it is possible to use the second identifier to identify the facial feature that differ greatly between the environment in which the first facial image data used to construct the first identifier is collected and the environment in which the first identifier is used, and thereby suppress deterioration of the identification performance for the feature. In addition, as for the cost of generating the second identifier, the feature to be identified is limited to at least one of the difference feature of the face and the difference-related feature, and the cost is correspondingly lower than the cost in the case that a separate identifier that identifier all the facial features is generated. That is, according to the above configuration, the first identifier can be used directly for the facial feature other than the difference feature, and the cost to cope with environmental changes can be suppressed correspondingly. Therefore, according to the above configuration, it is possible to suppress, with a low cost method, deterioration in the identification performance of the identifier caused by environmental changes.

Moreover, the plurality of features of the face to be identified may include all features that appear in the image. For example, the features may be selected from the type of facial expression, the alertness state, the position (including the relative positional relationship between specific organs) of a facial part (including organs), the shape of the facial part, the color of the facial part, and the state (opening degree, angle, etc.) of the facial part. The difference-related feature is not completely identical with the difference feature and may be any feature that can have a relationship with the difference feature. The difference-related feature may or may not be included in the plurality of features to be identified by the first identifier. As an example, when the difference feature is an eye-related feature, such as the size of the eyes and the shape of the eyes, the difference-related feature may be the distance between the eyes, the distance between the eye and the eyebrow, the shape of the eyebrow, the size of the eyebrow, and the like. The "identification of feature" may include any processing for identifying the type or the attribute value of the feature, such as determining one or a plurality of classes to which the feature belongs, determining whether the feature belongs to a predetermined class, deriving a probability or reliability at which the feature belongs to a predetermined class, deriving the attribute value of the feature, and the like. The "identifier" may be configured of a learning model that can acquire the ability to make a predetermined inference by machine learning, such as a neural network, a support vector machine, a self-organizing map, a reinforcement learning model, and the like.

In the facial image identification system according to the above aspect, the third facial image data may be configured of a copy of the second facial image data or partial facial image data obtained by extracting, from the second facial image data, a part in which at least one of the difference feature and the difference-related feature. According to the above configuration, it is possible to suppress the cost required to obtain the third facial image data. Therefore, it is possible to suppress, with a further low cost method, the deterioration of the identification performance of the identifier caused by environmental changes.

In the facial image identification system according to the above aspect, the second facial image data may be selected from facial image data in which the plurality of features is reflected and in which at least one of the plurality of features is not identifiable or is erroneously identified by the first identifier. According to the configuration, it is possible to appropriately extract the difference feature of the face which may differ greatly due to environmental changes. Therefore, it is possible to appropriately suppress the deterioration of the identification performance of the identifier caused by environmental change.

In the facial image identification system according to the above aspect, the output unit may output the result obtained by identifying the facial feature other than the difference feature among the plurality of features based on the output of the first identifier, and output the result obtained by identifying at least one of the difference feature and the difference-related feature based on the output of the second identifier. According to the above configuration, it is possible to obtain a more precise identification result for a plurality of facial features.

In the facial image identification system according to the above aspect, the predetermined condition may be defined so that one or a plurality of features is selected in order from the feature having the largest difference, and the difference extraction unit may select one or a plurality of features in order from the feature having the largest difference between the first feature amount and the second feature amount, and extract the selected one or a plurality of features as the difference feature. According to the above configuration, the difference feature can be extracted appropriately.

In the facial image identification system according to the above aspect, the predetermined condition may be defined so that a feature in which the difference exceeds a threshold value is selected, and the difference extraction unit may determine whether the difference between the first feature amount and the second feature amount exceeds the threshold value, and extract the feature in which the difference between the first feature amount and the second feature amount is determined to exceed the threshold value as the difference feature. According to the above configuration, the difference feature can be extracted appropriately.

In addition, from the facial image identification system according to each of the above forms, for example, some of the part that generates the second identifier, the part that performs image recognition with the first identifier and the second identifier may be extracted to configure a device of another form.

For example, the identifier generation device according to one aspect of the present invention includes: a first feature amount acquisition unit, which acquires a first feature amount related to each feature and calculated from first facial image data used in machine learning for constructing a first identifier so as to identify a plurality of features of a face; a second feature amount acquisition unit, which acquires a second feature amount related to each feature and calculated from second facial image data in which the plurality of features of the face is reflected, wherein the second facial image data is acquired in an environment in which the first identifier is used and the second facial image data is the same type as the first facial image data; a difference extraction unit, which compares the first feature amount and the second feature amount for each of the features and extracts, based on the result of the comparison and among the plurality of features, a feature having a size in which the difference between the first feature amount and the second feature amount satisfies a predetermined condition as a difference feature; a learning data acquisition unit, which acquires third facial image data in the environment in which the first identifier is used, wherein at least one of the difference feature and a difference-related feature that is a feature related to the difference feature is reflected in the third facial image data; and a learning processing unit, which constructs, by machine learning in which the third facial image data is used, a second identifier that identifies at least one of the difference feature and the difference-related feature from the third facial image data.

In addition, for example, the identification device according to one aspect of the present invention includes: a target data acquisition unit, which acquires target facial image data that is a target for identifying a plurality of features; a first identification unit, which inputs the acquired target facial image data to a first identifier constructed by machine learning to identify a plurality of features of a face, and thereby acquires, from the first identifier, an output corresponding to the result obtained by identifying the plurality of features from the target facial image data; a second identification unit, which inputs the acquired target facial image data to a second identifier constructed by machine learning to identify at least one of a difference feature extracted from a plurality of features and a difference-related feature which is a feature related to the difference feature, and thereby acquires, from the second identifier, an output corresponding to the result obtained by identifying at least one of the difference feature and the difference-related feature from the target facial image data; and an output unit, which outputs, based on the output of the first identifier and the output of the second identifier, the result obtained by identifying the plurality of features from the target facial image data. Moreover, the second identifier may be generated by the above identifier generation device.

Furthermore, the facial image identification system, the identifier generation device, and the identification device according to each of the above forms may be applied to any scene in which an identifier (first identifier) is generated from data collected in advance, such as a scene in which some feature is identified from image data other than facial image data in which a face is reflected, a scene in which some feature is identified from data other than image data, and other scenes.

For example, the image identification system according to one aspect of the present invention includes: a first feature amount acquisition unit, which acquires a first feature amount related to each feature and calculated from first image data used in machine learning for constructing a first identifier so as to identify a plurality of features, wherein the plurality of features is reflected in the first image data; a second feature amount acquisition unit, which acquires a second feature amount related to each feature and calculated from second image data in which the plurality of features is reflected, wherein the second image data is acquired in an environment in which the first identifier is used and the second image data is the same type as the first image data; a difference extraction unit, which compares the first feature amount and the second feature amount for each of the features and extracts, based on the result of the comparison and among the plurality of features, a feature having a size in which the difference between the first feature amount and the second feature amount satisfies a predetermined condition as a difference feature; a learning data acquisition unit, which acquires third image data in the environment in which the first identifier is used, wherein at least one of the extracted difference feature and a difference-related feature that is a feature related to the difference feature is reflected in the third image data; a learning processing unit, which constructs, by machine learning in which the third image data is used, a second identifier that identifies at least one of the difference feature and the difference-related feature from the third image data; a target data acquisition unit, which acquires target image data that is a target for identifying the plurality of features; a first identification unit, which inputs the acquired target image data to the first identifier, and thereby acquires, from the first identifier, an output corresponding to the result obtained by identifying the plurality of features from the target image data; a second identification unit, which inputs the acquired target image data to the second identifier, and thereby acquires, from the second identifier, an output corresponding to the result obtained by identifying at least one of the difference feature and the difference-related feature from the target image data; and an output unit, which outputs, based on the output of the first identifier and the output of the second identifier, the result obtained by identifying the plurality of features from the target image data.

In addition, for example, the identifier generation device according to one aspect of the present invention includes: a first feature amount acquisition unit, which acquires a first feature amount related to each feature and calculated from first image data used in machine learning for constructing a first identifier so as to identify a plurality of features, wherein the plurality of features is reflected in the first image data; a second feature amount acquisition unit, which acquires a second feature amount related to each feature and calculated from second image data in which the plurality of features is reflected, wherein the second image data is acquired in an environment in which the first identifier is used and the second image data is the same type as the first image data; a difference extraction unit, which compares the first feature amount and the second feature amount for each of the features and extracts, based on the result of the comparison and among the plurality of features, a feature having a size in which the difference between the first feature amount and the second feature amount satisfies a predetermined condition as a difference feature; a learning data acquisition unit, which acquires third image data in the environment in which the first identifier is used, wherein at least one of the extracted difference feature and a difference-related feature that is a feature related to the difference feature is reflected in the third image data; and a learning processing unit, which constructs, by machine learning in which the third image data is used, a second identifier that identifies at least one of the difference feature and the difference-related feature from the third image data.

In addition, for example, the identification device according to one aspect of the present invention includes: a target data acquisition unit, which acquires target image data that is a target for identifying a plurality of features; a first identification unit, which inputs the acquired target image data to a first identifier constructed by machine learning to identify a plurality of features, and thereby acquires, from the first identifier, an output corresponding to the result obtained by identifying the plurality of features from the target image data; a second identification unit, which inputs the acquired target image data to a second identifier constructed by machine learning to identify at least one of a difference feature extracted from a plurality of features and a difference-related feature which is a feature related to the difference feature, and thereby acquires, from the second identifier, an output corresponding to the result obtained by identifying at least one of the difference feature and the difference-related feature from the target image data; and an output unit, which outputs, based on the output of the first identifier and the output of the second identifier, the result obtained by identifying the plurality of features from the target image data. Moreover, the second identifier may be generated by the above identifier generation device.

In addition, for example, the identification system according to one aspect of the present invention includes: a first feature amount acquisition unit, which acquires a first feature amount related to each feature and calculated from first data used in machine learning for constructing a first identifier so as to identify a plurality of features, wherein the plurality of features is reflected in the first data; a second feature amount acquisition unit, which acquires a second feature amount related to each feature and calculated from second data in which the plurality of features is included, wherein the second data is acquired in an environment in which the first identifier is used and the second data is the same type as the first data; a difference extraction unit, which compares the first feature amount and the second feature amount for each of the features and extracts, based on the result of the comparison and among the plurality of features, a feature having a size in which the difference between the first feature amount and the second feature amount satisfies a predetermined condition as a difference feature; a learning data acquisition unit, which acquires third data in the environment in which the first identifier is used, wherein at least one of the extracted difference feature and a difference-related feature that is a feature related to the difference feature is included in the third data; a learning processing unit, which constructs, by machine learning in which the third data is used, a second identifier that identifies at least one of the difference feature and the difference-related feature from the third data; a target data acquisition unit, which acquires target data that is a target for identifying the plurality of features; a first identification unit, which inputs the acquired target data to the first identifier, and thereby acquires, from the first identifier, an output corresponding to the result obtained by identifying the plurality of features from the target data; a second identification unit, which inputs the acquired target data to the second identifier, and thereby acquires, from the second identifier, an output corresponding to the result obtained by identifying at least one of the difference feature and the difference-related feature from the target data; and an output unit, which outputs, based on the output of the first identifier and the output of the second identifier, the result obtained by identifying the plurality of features from the target data.

Moreover, "data" may include all types of data that can be analyzed by the identifier, and may be, for example, sound data (voice data), numerical data, text data, and the like in addition to image data. "Feature" may include all features identifiable from the data. The "plurality of features" may be a series of related features (for example, a character string identified from voice data), and in this case, the "difference feature" may be a part of the series of features. The "environment" may be appropriately specified according to, for example, attributes of a scene in which the data used in machine learning of the identifier is collected and a scene in which the identifier is used, such as the conditions of data acquisition, the device used to acquire the data, the region, and the like.

In the identification system according to the above aspect, the third data may be configured of a copy of the second data or partial data obtained by extracting, from the second data, a part in which at least one of the difference feature and the difference-related feature is included.

In the identification system according to the above aspect, the second data may be selected from data in which the plurality of features is included and in which at least one of the plurality of features is not identifiable or is erroneously identified by the first identifier.

In the identification system according to the above aspect, the output unit may output the result obtained by identifying the feature other than the difference feature among the plurality of features based on the output of the first identifier, and output the result obtained by identifying at least one of the difference feature and the difference-related feature based on the output of the second identifier.

In the identification system according to the above aspect, the predetermined condition may be defined so that one or a plurality of features is selected in order from the feature having the largest difference, and the difference extraction unit may select one or a plurality of features in order from the feature having the largest difference between the first feature amount and the second feature amount, and extracts the selected one or a plurality of features as the difference feature.

In the identification system according to one aspect described above, the predetermined condition may be defined so that a feature in which the difference exceeds a threshold value is selected, and the difference extraction unit determines whether the difference between the first feature amount and the second feature amount exceeds the threshold value, and extracts the feature in which the difference between the first feature amount and the second feature amount is determined to exceed the threshold value as the difference feature.

In addition, for example, the identifier generation device according to one aspect of the present invention includes: a first feature amount acquisition unit, which acquires a first feature amount related to each feature and calculated from first data used in machine learning for constructing a first identifier so as to identify a plurality of features, wherein the plurality of features is included in the first data; a second feature amount acquisition unit, which acquires a second feature amount related to each feature and calculated from second data in which the plurality of features is included, wherein the second data is acquired in an environment in which the first identifier is used and the second data is the same type as the first data; a difference extraction unit, which compares the first feature amount and the second feature amount for each of the features and extracts, based on the result of the comparison and among the plurality of features, a feature having a size in which the difference between the first feature amount and the second feature amount satisfies a predetermined condition as a difference feature; a learning data acquisition unit, which acquires third data in the environment in which the first identifier is used, wherein at least one of the extracted difference feature and a difference-related feature that is a feature related to the difference feature is included in the third data; a learning processing unit, which constructs, by machine learning in which the third data is used, a second identifier that identifies at least one of the difference feature and the difference-related feature from the third data.

In addition, for example, the identification device according to one aspect of the present invention includes: a target data acquisition unit, which acquires target data that is a target for identifying a plurality of features; a first identification unit, which inputs the acquired target data to a first identifier constructed by machine learning to identify a plurality of features, and thereby acquires, from the first identifier, an output corresponding to the result obtained by identifying the plurality of features from the target data; a second identification unit, which inputs the acquired target data to a second identifier constructed by machine learning to identify at least one of a difference feature extracted from a plurality of features and a difference-related feature which is a feature related to the difference feature, and thereby acquires, from the second identifier, an output corresponding to the result obtained by identifying at least one of the difference feature and the difference-related feature from the target data; and an output unit, which outputs, based on the output of the first identifier and the output of the second identifier, the result obtained by identifying the plurality of features from the target data. Moreover, the second identifier may be generated by the above identifier generation device.

As another aspect of the facial image identification system, the image identification system, the identification system, the identifier generation device, and the identification device according to each of the above forms, the present invention may be an information processing method for realizing each of the above configurations, a program, or a storage medium that stores such a program and is readable by a computer, other devices, machines, or the like. Here, a computer-readable storage medium is a medium that stores information such as programs by electrical, magnetic, optical, mechanical, or chemical action.

For example, the facial image identification method according to one aspect of the present invention is an information processing method in which a computer executes the following steps: a step of acquiring a first feature amount related to each feature and calculated from first facial image data used in machine learning for constructing a first identifier so as to identify a plurality of features of a face; a step of acquiring a second feature amount related to each feature and calculated from second facial image data in which the plurality of features of the face is reflected, wherein the second facial image data is acquired in an environment in which the first identifier is used and the second facial image data is the same type as the first facial image data; a step of comparing the first feature amount and the second feature amount for each of the features and extracting, based on the result of the comparison and among the plurality of features, a feature having a size in which the difference between the first feature amount and the second feature amount satisfies a predetermined condition as a difference feature; a step of acquiring third facial image data in the environment in which the first identifier is used, wherein at least one of the difference feature and a difference-related feature that is a feature related to the difference feature is reflected in the third facial image data; a step of constructing, by machine learning in which the third facial image data is used, a second identifier that identifies at least one of the difference feature and the difference-related feature from the third facial image data; a step of acquiring target facial image data that is a target for identifying the plurality of features; a step of inputting the acquired target facial image data to the first identifier, and thereby acquiring, from the first identifier, an output corresponding to the result obtained by identifying the plurality of features from the target facial image data; a step of inputting the acquired target facial image data to the second identifier, and thereby acquiring, from the second identifier, an output corresponding to the result obtained by identifying at least one of the difference feature and the difference-related feature from the target facial image data; and a step of outputting, based on the output of the first identifier and the output of the second identifier, the result obtained by identifying the plurality of features from the target facial image data.

In addition, for example, the identifier generation method according to one aspect of the present invention is an information processing method in which a computer executes the following steps: a step of acquiring a first feature amount related to each feature and calculated from first facial image data used in machine learning for constructing a first identifier so as to identify a plurality of features of a face; a step of acquiring a second feature amount related to each feature and calculated from second facial image data in which the plurality of features of the face is reflected, wherein the second facial image data is acquired in an environment in which the first identifier is used and the second facial image data is the same type as the first facial image data; a step of comparing the first feature amount and the second feature amount for each of the features and extracting, based on the result of the comparison and among the plurality of features, a feature having a size in which the difference between the first feature amount and the second feature amount satisfies a predetermined condition as a difference feature; a step of acquiring third facial image data in the environment in which the first identifier is used, wherein at least one of the difference feature and a difference-related feature that is a feature related to the difference feature is reflected in the third facial image data; and a step of constructing, by machine learning in which the third facial image data is used, a second identifier that identifies at least one of the difference feature and the difference-related feature from the third facial image data.

In addition, for example, the identifier generation program according to one aspect of the present invention is a program for causing a computer to execute the following steps: a step of acquiring a first feature amount related to each feature and calculated from first facial image data used in machine learning for constructing a first identifier so as to identify a plurality of features of a face; a step of acquiring a second feature amount related to each feature and calculated from second facial image data in which the plurality of features of the face is reflected, wherein the second facial image data is acquired in an environment in which the first identifier is used and the second facial image data is the same type as the first facial image data; a step of comparing the first feature amount and the second feature amount for each of the features and extracting, based on the result of the comparison and among the plurality of features, a feature having a size in which the difference between the first feature amount and the second feature amount satisfies a predetermined condition as a difference feature; a step of acquiring third facial image data in the environment in which the first identifier is used, wherein at least one of the difference feature and a difference-related feature that is a feature related to the difference feature is reflected in the third facial image data; and a step of constructing, by machine learning in which the third facial image data is used, a second identifier that identifies at least one of the difference feature and the difference-related feature from the third facial image data.

In addition, for example, the image identifying method according to one aspect of the present invention is an information processing method in which a computer executes the following steps: a step of acquiring a first feature amount related to each feature and calculated from first image data used in machine learning for constructing a first identifier so as to identify a plurality of features, wherein the plurality of features is reflected in the first image data; a step of acquiring a second feature amount related to each feature and calculated from second image data in which the plurality of features is reflected, wherein the second image data is acquired in an environment in which the first identifier is used and the second image data is the same type as the first image data; a step of comparing the first feature amount and the second feature amount for each of the features and extracting, based on the result of the comparison and among the plurality of features, a feature having a size in which the difference between the first feature amount and the second feature amount satisfies a predetermined condition as a difference feature; a step of acquiring third image data in the environment in which the first identifier is used, wherein at least one of the extracted difference feature and a difference-related feature that is a feature related to the difference feature is reflected in the third image data; a step of constructing, by machine learning in which the third image data is used, a second identifier that identifies at least one of the difference feature and the difference-related feature from the third image data; a step of acquiring target image data that is a target for identifying the plurality of features; a step of inputting the acquired target image data to the first identifier, and thereby acquiring, from the first identifier, an output corresponding to the result obtained by identifying the plurality of features from the target image data; a step of inputting the acquired target image data to the second identifier, and thereby acquiring, from the second identifier, an output corresponding to the result obtained by identifying at least one of the difference feature and the difference-related feature from the target image data; and a step of outputting, based on the output of the first identifier and the output of the second identifier, the result obtained by identifying the plurality of features from the target image data.

In addition, for example, the identifier generation method according to one aspect of the present invention is an information processing method in which a computer executes the following steps: a step of acquiring a first feature amount related to each feature and calculated from first image data used in machine learning for constructing a first identifier so as to identify a plurality of features, wherein the plurality of features is reflected in the first image data; a step of acquiring a second feature amount related to each feature and calculated from second image data in which the plurality of features is reflected, wherein the second image data is acquired in an environment in which the first identifier is used and the second image data is the same type as the first image data; a step of comparing the first feature amount and the second feature amount for each of the features and extracting, based on the result of the comparison and among the plurality of features, a feature having a size in which the difference between the first feature amount and the second feature amount satisfies a predetermined condition as a difference feature; a step of acquiring third image data in the environment in which the first identifier is used, wherein at least one of the extracted difference feature and a difference-related feature that is a feature related to the difference feature is reflected in the third image data; and a step of constructing, by machine learning in which the third image data is used, a second identifier that identifies at least one of the difference feature and the difference-related feature from the third image data.

In addition, for example, the identifier generation program according to one aspect of the present invention is a program for causing a computer to execute the following steps: a step of acquiring a first feature amount related to each feature and calculated from first image data used in machine learning for constructing a first identifier so as to identify a plurality of features, wherein the plurality of features is reflected in the first image data; a step of acquiring a second feature amount related to each feature and calculated from second image data in which the plurality of features is reflected, wherein the second image data is acquired in an environment in which the first identifier is used and the second image data is the same type as the first image data; a step of comparing the first feature amount and the second feature amount for each of the features and extracting, based on the result of the comparison and among the plurality of features, a feature having a size in which the difference between the first feature amount and the second feature amount satisfies a predetermined condition as a difference feature; a step of acquiring third image data in the environment in which the first identifier is used, wherein at least one of the extracted difference feature and a difference-related feature that is a feature related to the difference feature is reflected in the third image data; and a step of constructing, by machine learning in which the third image data is used, a second identifier that identifies at least one of the difference feature and the difference-related feature from the third image data.

In addition, for example, the identification method according to one aspect of the present invention is an information processing method in which a computer executes the following steps: a step of acquiring a first feature amount related to each feature and calculated from first data used in machine learning for constructing a first identifier so as to identify a plurality of features, wherein the plurality of features is included in the first data; a step of acquires a second feature amount related to each feature and calculated from second data in which the plurality of features is included, wherein the second data is acquired in an environment in which the first identifier is used and the second data is the same type as the first data; a step of comparing the first feature amount and the second feature amount for each of the features and extracting, based on the result of the comparison and among the plurality of features, a feature having a size in which the difference between the first feature amount and the second feature amount satisfies a predetermined condition as a difference feature; a step of acquiring third data in the environment in which the first identifier is used, wherein at least one of the extracted difference feature and a difference-related feature that is a feature related to the difference feature is included in the third data; a step of constructing, by machine learning in which the third data is used, a second identifier that identifies at least one of the difference feature and the difference-related feature from the third data; a step of acquiring target data that is a target for identifying the plurality of features; a step of inputting the acquired target data to the first identifier, and thereby acquiring, from the first identifier, an output corresponding to the result obtained by identifying the plurality of features from the target data; a step of inputting the acquired target data to the second identifier, and thereby acquiring, from the second identifier, an output corresponding to the result obtained by identifying at least one of the difference feature and the difference-related feature from the target data; and a step of outputting, based on the output of the first identifier and the output of the second identifier, the result obtained by identifying the plurality of features from the target data.

In addition, for example, the identifier generation method according to one aspect of the present invention is an information processing method in which a computer executes the following steps: a step of acquiring a first feature amount related to each feature and calculated from first data used in machine learning for constructing a first identifier so as to identify a plurality of features, wherein the plurality of features is included in the first data; a step of acquires a second feature amount related to each feature and calculated from second data in which the plurality of features is included, wherein the second data is acquired in an environment in which the first identifier is used and the second data is the same type as the first data; a step of comparing the first feature amount and the second feature amount for each of the features and extracting, based on the result of the comparison and among the plurality of features, a feature having a size in which the difference between the first feature amount and the second feature amount satisfies a predetermined condition as a difference feature; a step of acquiring third data in the environment in which the first identifier is used, wherein at least one of the extracted difference feature and a difference-related feature that is a feature related to the difference feature is included in the third data; a step of constructing, by machine learning in which the third data is used, a second identifier that identifies at least one of the difference feature and the difference-related feature from the third data.

In addition, for example, the identifier generation program according to one aspect of the present invention is a program for causing a computer to execute the following steps: a step of acquiring a first feature amount related to each feature and calculated from first data used in machine learning for constructing a first identifier so as to identify a plurality of features, wherein the plurality of features is included in the first data; a step of acquires a second feature amount related to each feature and calculated from second data in which the plurality of features is included, wherein the second data is acquired in an environment in which the first identifier is used and the second data is the same type as the first data; a step of comparing the first feature amount and the second feature amount for each of the features and extracting, based on the result of the comparison and among the plurality of features, a feature having a size in which the difference between the first feature amount and the second feature amount satisfies a predetermined condition as a difference feature; a step of acquiring third data in the environment in which the first identifier is used, wherein at least one of the extracted difference feature and a difference-related feature that is a feature related to the difference feature is included in the third data; a step of constructing, by machine learning in which the third data is used, a second identifier that identifies at least one of the difference feature and the difference-related feature from the third data.

Effect

According to the present invention, it is possible to provide a technology that suppresses, with a low cost method, deterioration in the identification performance of an identifier caused by environmental changes.

DESCRIPTION OF THE EMBODIMENTS

Figure 1:
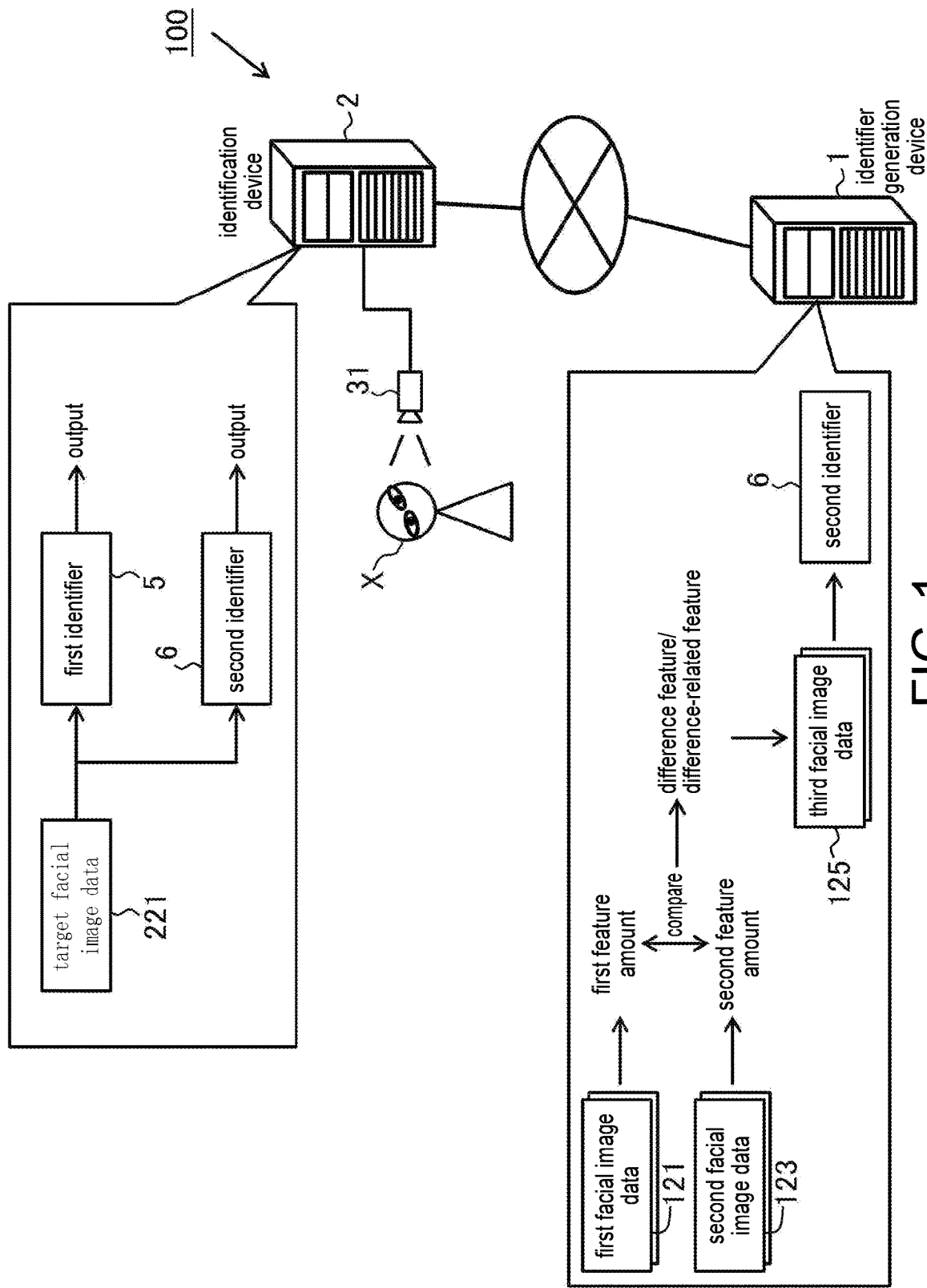
FIG. 1 schematically illustrates an example of a scene to which the present invention is applied.

Hereinafter, an embodiment according to one aspect of the present invention (hereinafter, also referred to as "the present embodiment") is described with reference to the drawings. However, the present embodiment described below is merely an example of the present invention in all respects. It is evident that various improvements and modifications can be made without departing from the scope of the present invention. That is, in implementing the present invention, a specific configuration according to the embodiment may be appropriately employed. Moreover, although the data that appears in this embodiment is described in natural language, more specifically, the data is specified by a computer-recognizable pseudo language, command, parameter, machine language, or the like.

§ 1 Application Example

First, an example of the basic configuration of the present invention is described. When the identifier is generated from the data collected in advance, the following problem may occur. That is, when the features appearing in the data used to generate the identifier differ greatly from the features appearing in the data obtained in the environment in which the identifier is used, the identification performance of the identifier in the environment may deteriorate. When a separate identifier to be used in the environment is generated in order to cope with this problem, new data is collected and the separate identifier is generated based on the collected data, leading to an increase in the cost correspondingly.

Therefore, in one example of the present invention, a first feature amount calculated from first data and relating to a plurality of features is acquired, the first data including the plurality of features and used in machine learning for constructing a first identifier to identify the plurality of features. In addition, a second feature amount related to each of a plurality of features and calculated from second data in which the plurality of features is included is acquired, the second data being acquired in the environment in which the first identifier is used and being the same type as the first data.

Next, for each feature, the first feature amount and the second feature amount are compared, and a feature having a size in which the difference between the first feature amount and the second feature amount satisfies a predetermined condition is extracted as a difference feature among the plurality of features on the basis of result of the comparison. Then, in the environment in which the first identifier is used, third data including at least one of the extracted difference feature and the difference-related feature related to the difference feature is acquired, and a second identifier that identifies at least one of the difference feature and the difference-related feature is constructed by machine learning in which the acquired third data is used.

Moreover, "feature" may include any feature that can be identified from the data. In addition, the "plurality of features" may be a series of related features, and in this case, the "difference feature" may be a part of the series of features. The difference-related feature does not completely match the difference feature, but may be any feature that has a relationship with the difference feature. The difference-related feature may or may not be included in the plurality of features to be identified by the first identifier. As an example, when the facial image data showing a face is to be processed, the feature to be identified may be, for example, the state of a facial part shown in the facial image data. The feature amount may be, for example, the size, the angle, the color or the like of the facial part. When the difference feature is an eye-related feature, such as the size of the eyes and the shape of the eyes, the difference-related feature may be the distance between the eyes, the distance between the eye and the eyebrow, the shape of the eyebrow, the size of the eyebrow, and the like.

Accordingly, in the configuration, the constructed second identifier is used to identify the feature (the difference feature and/or the difference-related feature) that is greatly different between the environment in which the first data used to construct the first identifier is collected and the environment in which the first identifier is used, and thereby the deterioration of the identification performance for the feature can be suppressed. In addition, as for the cost of generating the second identifier, the feature to be identified is limited to at least one of the difference feature and the difference-related feature, and the cost is correspondingly lower than the cost in the case that a separate identifier that identifies all the features is generated. In other words, instead of discarding the first identifier and generating a separate identifier, the first identifier is used directly to identify the features other than the difference feature, and the cost to cope with environmental changes can be suppressed correspondingly. Therefore, according to the configuration, it is possible to suppress, with a low cost method, deterioration in the identification performance of the identifier caused by the environmental changes.

Next, an example of a scene to which the present invention is applied is described with reference to FIG. 1. FIG. 1 schematically illustrates an example of a scene in which the present invention is applied to facial image analysis. However, the application range of the present invention is not limited to the facial image analysis exemplified below. The present invention can be applied to all situations in which an identifier is generated from previously collected data.

The facial image identification system 100 illustrated in FIG. 1 includes an identifier generation device 1 and an identification device 2 connected via a network. In the example of FIG. 1, the identifier generator 1 and the identification device 2 are separate computers. However, the configuration of the facial image identification system 100 may not be limited to this example, and the identifier generation device 1 and the identification device 2 may be an integrated computer, or each of the identifier generation device 1 and the identification device 2 may be configured of a plurality of computers. Moreover, the type of the network between the identifier generation device 1 and the identification device 2 may be appropriately selected from, for example, the Internet, a wireless communication network, a mobile communication network, a telephone network, a dedicated network, and the like.

The identifier generation device 1 is a computer configured to generate the second identifier. Specifically, first, the identifier generation device 1 acquires the first feature amount related to each feature and calculated from first facial image data 121 used in machine learning for constructing the first identifier 5 so as to identify a plurality of features of the face. In addition, the identifier generation device 1 acquires the second feature amount related to each feature and calculated from second facial image data 123 in which the plurality of features of the face is reflected, wherein the second facial image data 123 being acquired in the environment in which the first identifier 5 is used and being the same type as the first facial image data 121.

The "environment" may be appropriately specified by, for example, attributes of a scene of collecting data used in machine learning of the identifier and a scene of using the identifier, such as a condition for acquiring the data, a device used for acquiring the data, region, and the like. In addition, the plurality of features of the face to be identified may include all the features of the face appearing in the image. For example, the features may be selected from the type of facial expression, the alertness state, the position (including the relative positional relationship between specific organs) of a facial part (including organs), the shape of the facial part, the color of the facial part, and the state (opening degree, angle, etc.) of the facial part.

Next, the identifier generation device 1 obtains the first feature amount and the second feature amount for each feature, and extracts a feature as a difference feature among the plurality of features on the basis of result of the comparison, the feature having a size in which the difference between the first feature amount and the second feature amount satisfies a predetermined condition. Subsequently, the identifier generation device 1 acquires, in the environment in which the first identifier 5 is used, third facial image data 125 in which at least one of the difference feature and the difference-related feature is reflected. Then, by machine learning in which the acquired third facial image data 125 is used, the identifier generation device 1 construct a second identifier 6 which identifies at least one of the difference feature and the difference-related feature from the third facial image data 125.

On the other hand, the identification device 2 is a computer configured to use the first identifier 5 and the second identifier 6 to identify a plurality of features of a face from facial image data. Specifically, first, the identification device 2 acquires target facial image data 221 which is a target for identifying a plurality of features of a face. In the present embodiment, the identification device 2 is connected to a camera 31, and the target facial image data 221 of a target person X who is a target for identifying a plurality of features of the face is acquired through the camera 31.

Next, the identification device 2 inputs the acquired target facial image data 221 to the first identifier 5, and thereby acquires, from the identifier 5, output corresponding to the result obtained by identifying a plurality of features from the target facial image data 221. In addition, the identification device 2 inputs the acquired target facial image data 221 to the second identifier 6, and thereby acquires, from the second identifier 6, output corresponding to the result obtained by identifying at least one of the difference feature and the difference-related feature from the target facial image data 221. Then, the identification device 2 outputs the result obtained by identifying a plurality of features from the target facial image data 221 based on the output of the first identifier 5 and the output of the second identifier 6.

As described above, the facial image identification system 100 according to the present embodiment compares the first feature amount calculated from the first facial image data 121 and the second feature amount calculated from the second facial image data 123 to thereby extract facial features that may differ greatly due to environmental changes as difference features. Then, by machine learning using the third facial image data which shows at least one of the extracted difference feature and the difference-related feature, the facial image identification system 100 according to the present embodiment constructs the second identifier for identifying at least one of the difference feature and the difference-related feature. As a result, the facial image identification system 100 can use the first identifier 5 to identify a plurality of features of the face of the target person X from the target facial image data 221, and use the second identifier 6 in the identification of at least one of the difference feature and the difference-related feature which may not be accurately identified by the first identifier 5.

Therefore, according to this embodiment, the second identifier 6 is used to identify the feature (difference feature and/or difference-related feature) of the face that differ greatly between the environment in which the first facial image data 121 used to construct the first identifier 5 is collected and the environment in which the first identifier 5 is used, and thereby the deterioration of the identification performance for the feature can be suppressed. In addition, as for the cost of generating the second identifier 6, the feature to be identified is limited to at least one of the difference feature of the face and the difference-related feature, and the cost is correspondingly lower than the cost in the case that a separate identifier that identifies all the facial features is generated. That is, instead of discarding the first identifier 5 and generating a new identifier, the first identifier 5 can be used directly to identifying facial features other than the difference feature, and the cost to cope with environmental changes can be suppressed correspondingly. Therefore, according to the present embodiment, it is possible to suppress, with a low cost method, the identification performance of the identifier that identifies a plurality of features from a facial image from being deteriorated due to environmental changes.

§ 2 Configuration Example

Figure 2:
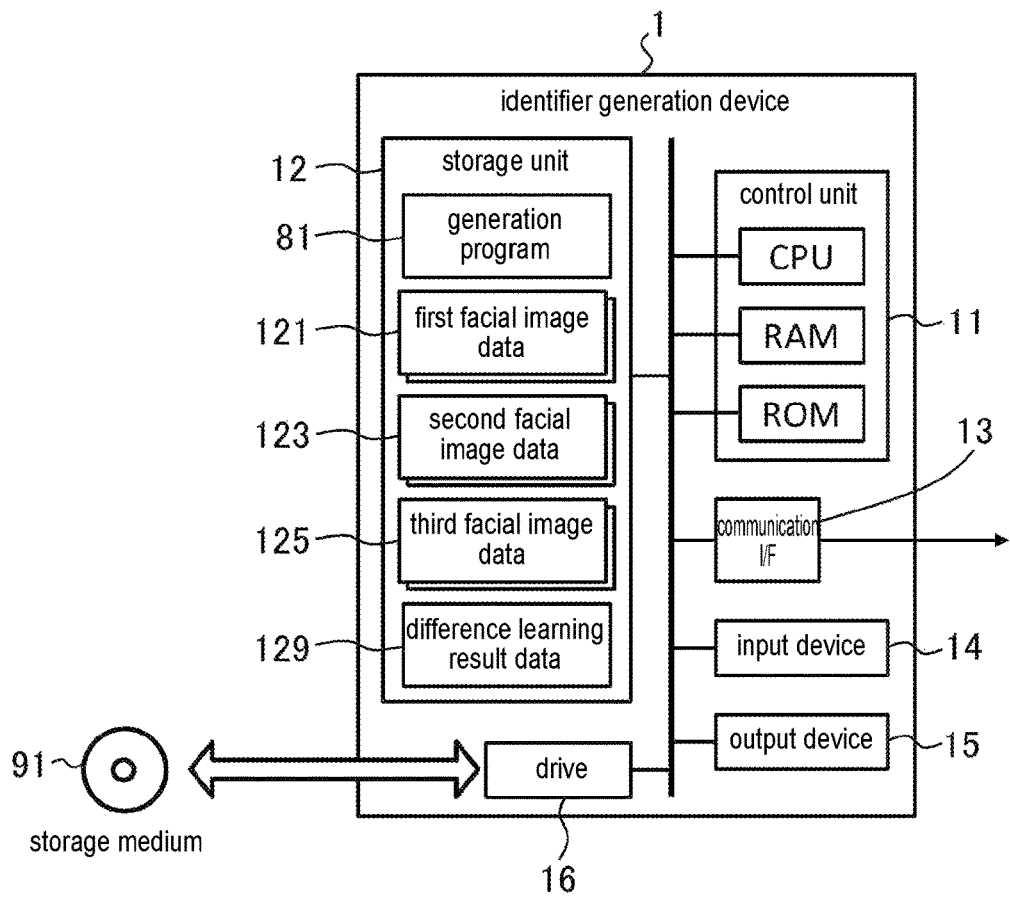
FIG. 2 schematically illustrates an example of the hardware configuration of an identifier generation device according to an embodiment.

[Hardware Configuration]
<Identifier Generation Device>
Next, an example of the hardware configuration of the identifier generation device 1 according to the present embodiment is described using FIG. 2. FIG. 2 schematically illustrates an example of the hardware configuration of the identifier generation device 1 according to this embodiment.

As shown in FIG. 2, the identifier generation device 1 according to the present embodiment is a computer in which a control unit 11, a storage unit 12, a communication interface 13, an input device 14, an output device 15, and a drive 16 are electrically connected. Moreover, in FIG. 2, the communication interface is described as "communication I/F".

The control unit 11 includes a central processing unit (CPU) which is a hardware processor, a random access memory (RAM), a read only memory (ROM) and the like, and executes information processing based on programs and various data. The storage unit 12 is an example of the memory, and includes, for example, a hard disk drive, a solid state drive, or the like. In the present embodiment, the storage unit 12 stores various information such as a generation program 81, the first facial image data 121, the second facial image data 123, the third facial image data 125, and difference learning result data 129.

The generation program 81 is a program for causing the identifier generation device 1 to execute information processing (FIG. 6) described later that generates the second identifier 6, and includes a series of commands for the information processing. The first facial image data 121 is facial image data in which a plurality of features of a face is reflected, and is facial image data used in machine learning of the first identifier 5. The second facial image data 123 is the same type of facial image data as the first facial image data 121, and is the facial image data collected in the environment in which the first identifier 5 is used. The third facial image data 125 is facial image data collected in the environment in which the first identifier 5 is used, and is facial image data in which at least one of the difference feature of the face and the difference-related feature is reflected. The difference learning result data 129 is data for setting the trained second identifier 6 constructed by machine learning in which the third facial image data 125 is used. Details will be described later.

The communication interface 13 is, for example, a wired local area network (LAN) module, a wireless LAN module or the like, and is an interface for performing wired or wireless communication via a network. The identifier generation device 1 can perform data communication with the identification device 2 via a network by using the communication interface 13.

The input device 14 is a device for inputting, such as a mouse, a keyboard, or the like. The output device 15 is a device for outputting, such as a display, a speaker, or the like. The operator can operate the identifier generation device 1 by using the input device 14 and the output device 15.

The drive 16 is, for example, a CD drive, a DVD drive, or the like, and is a drive device for reading a program stored in the storage medium 91. The type of the drive 16 may be appropriately selected according to the type of the storage medium 91. At least one of the generation program 81, the first facial image data 121, the second facial image data 123, and the third facial image data 125 may be stored in the storage medium 91.

The storage medium 91 is a medium for accumulating information, such as programs, by electrical, magnetic, optical, mechanical, or chemical action so that a computer or other devices, machines, or the like can read the information such as the recorded programs. The identifier generation device 1 acquires at least one of the generation program 81, the first facial image data 121, the second facial image data 123, and the third facial image data 125 from the storage medium 91.

Here, in FIG. 2, a disk-type storage medium such as CD, DVD or the like is illustrated as an example of the storage medium 91. However, the type of the storage medium 91 is not limited to the disc type and may be a type other than the disc type. The storage medium other than the disk type may be, for example, a semiconductor memory such as a flash memory.

Moreover, regarding the specific hardware configuration of the identifier generation device 1, it is possible to appropriately omit, replace, and add constituent elements according to the embodiment. For example, the control unit 11 may include a plurality of hardware processors. The hardware processor may be configured of a microprocessor, a field-programmable gate array (FPGA), a digital signal processor (DSP), and the like. The storage unit 12 may be configured of the RAM and ROM included in the control unit 11. At least one of the communication interface 13, the input device 14, the output device 15, and the drive 16 may be omitted. The identifier generation device 1 may be configured of a plurality of computers. In this case, the hardware configurations of the computers may or may not be identical. In addition, the identifier generation device 1 may be a general-purpose server device, a personal computer (PC), or the like, in addition to an information processing device designed specifically for the service to be provided.

<Identification Device>

Figure 3:
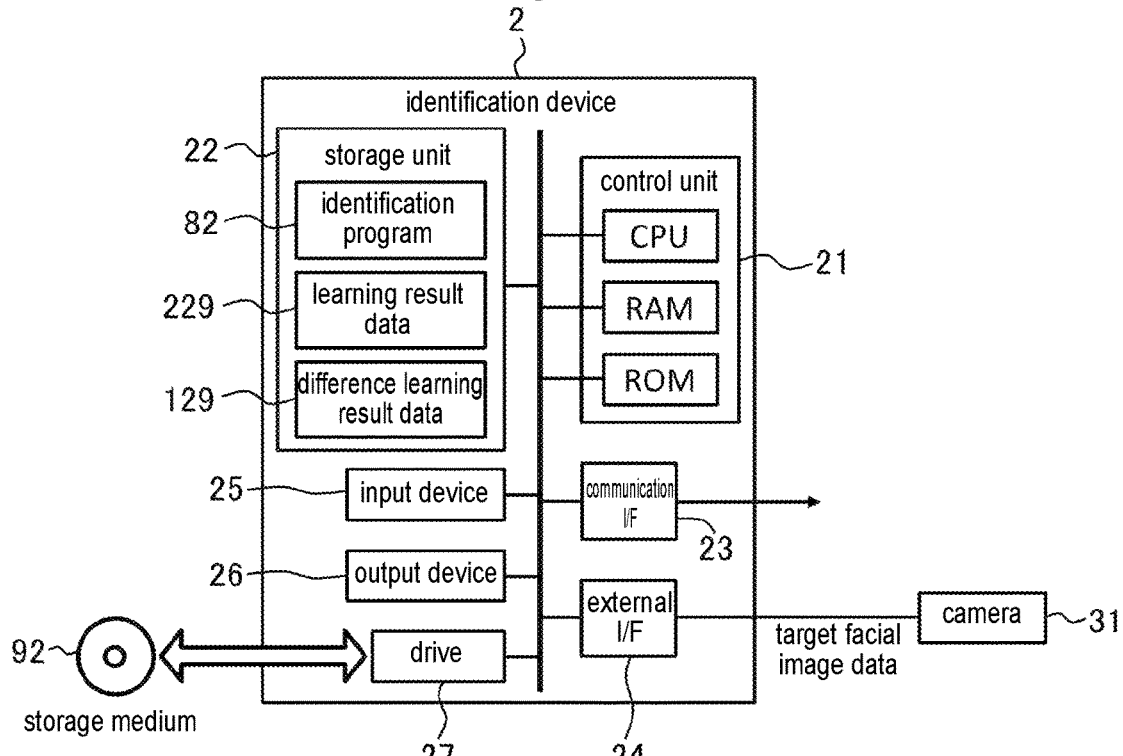
FIG. 3 schematically illustrates an example of the hardware configuration of an identification device according to an embodiment.

Next, an example of the hardware configuration of the identification device 2 according to the present embodiment is described using FIG. 3. FIG. 3 schematically illustrates an example of the hardware configuration of the identification device 2 according to the present embodiment.

As shown in FIG. 3, in the identification device 2 according to the present embodiment is a computer in which a control unit 21, a storage unit 22, a communication interface 23, an external interface 24, an input device 25, an output device 26, and a drive 27 are electrically connected. Moreover, in FIG. 3, the communication interface and the external interface are described as "communication I/F" and "external I/F", respectively.

The identification device 2 has the same configuration as the identification device generation device 1 except for the external interface 24. The control unit 21 includes a CPU which is a hardware processor, a RAM, a ROM and the like, and is configured to execute various information processing based on programs and data. The storage unit 22 is configured of, for example, a hard disk drive, a solid state drive and the like. The storage unit 22 stores a variety of information such as an identification program 82, learning result data 229, the difference learning result data 129, and the like.

The identification program 82 is a program for causing the identification device 2 to execute information processing (FIG. 7) described later in which the first identifier 5 and the second identifier 6 are used to identify a plurality of features of a face from the target facial image data 221, and the identification program 82 includes a series of commands for the information processing. The learning result data 229 is data for setting the trained first identifier 5 constructed by machine learning in which the first facial image data 121 is used. Details will be described later.

The communication interface 23 is, for example, a wired LAN module, a wireless LAN module or the like, and is an interface for performing wired or wireless communication via a network. The identification device 2 can perform data communication with the identifier generation device 1 via a network by using the communication interface 23.

The external interface 24 is, for example, a universal serial bus (USB) port, a dedicated port or the like, and is an interface for the connection to an external device. The type and the number of the external interface 24 may be appropriately selected according to the type and the number of the external devices to be connected. In the present embodiment, the identification device 2 is connected to a camera 31 via the external interface 24.

The camera 31 is used to acquire the target facial image data 221 by capturing images of the target person X. The type and the arrangement location of the camera 31 are not particularly limited and may be appropriately determined according to the embodiment. As the camera 31, for example, a known camera such as a digital camera or a video camera may be used. Moreover, when the camera 31 includes a communication interface, the identification device 2 may be connected to the camera 31 via the communication interface 23 instead of the external interface 24.

The input device 25 is a device for inputting, such as a mouse, a keyboard, or the like. The output device 26 is a device for outputting, such as a display, a speaker, or the like. The operator can operate the identification device 2 by using the input device 25 and the output device 26.

The drive 27 is, for example, a CD drive, a DVD drive, or the like, and is a drive device for reading a program stored in the storage medium 92. The drive 27 and the storage medium 92 may be configured similarly to the drive 16 and the storage medium 91, respectively. At least one of the identification program 82, the learning result data 229, and the difference learning result data 129 may be stored in the storage medium 92. In addition, the identification device 2 may acquire at least one of the identification program 82, the learning result data 229, and the difference learning result data 129 from the storage medium 92.

Moreover, regarding the specific hardware configuration of the identification device 2, similar to the case of the identification device generation device 1, it is possible to appropriately omit, replace, and add constituent elements according to the embodiment. For example, the control unit 21 may include a plurality of hardware processors. The hardware processor may be configured of a microprocessor, a FPGA, a DSP or the like. The storage unit 22 may be configured of the RAM and the ROM included in the control unit 21. At least one of the communication interface 23, the external interface 24, the input device 25, the output device 26, and the drive 27 may be omitted. The identification device 2 may be configured of a plurality of computers. In this case, the hardware configurations of the computers may or may not be identical. In addition to the information processing device designed specifically for the service to be provided, the identification device 2 may include a general-purpose server device, a general-purpose desktop PC, a notebook PC, a tablet PC, a mobile phone including a smartphone, and the like.

Figure 4:
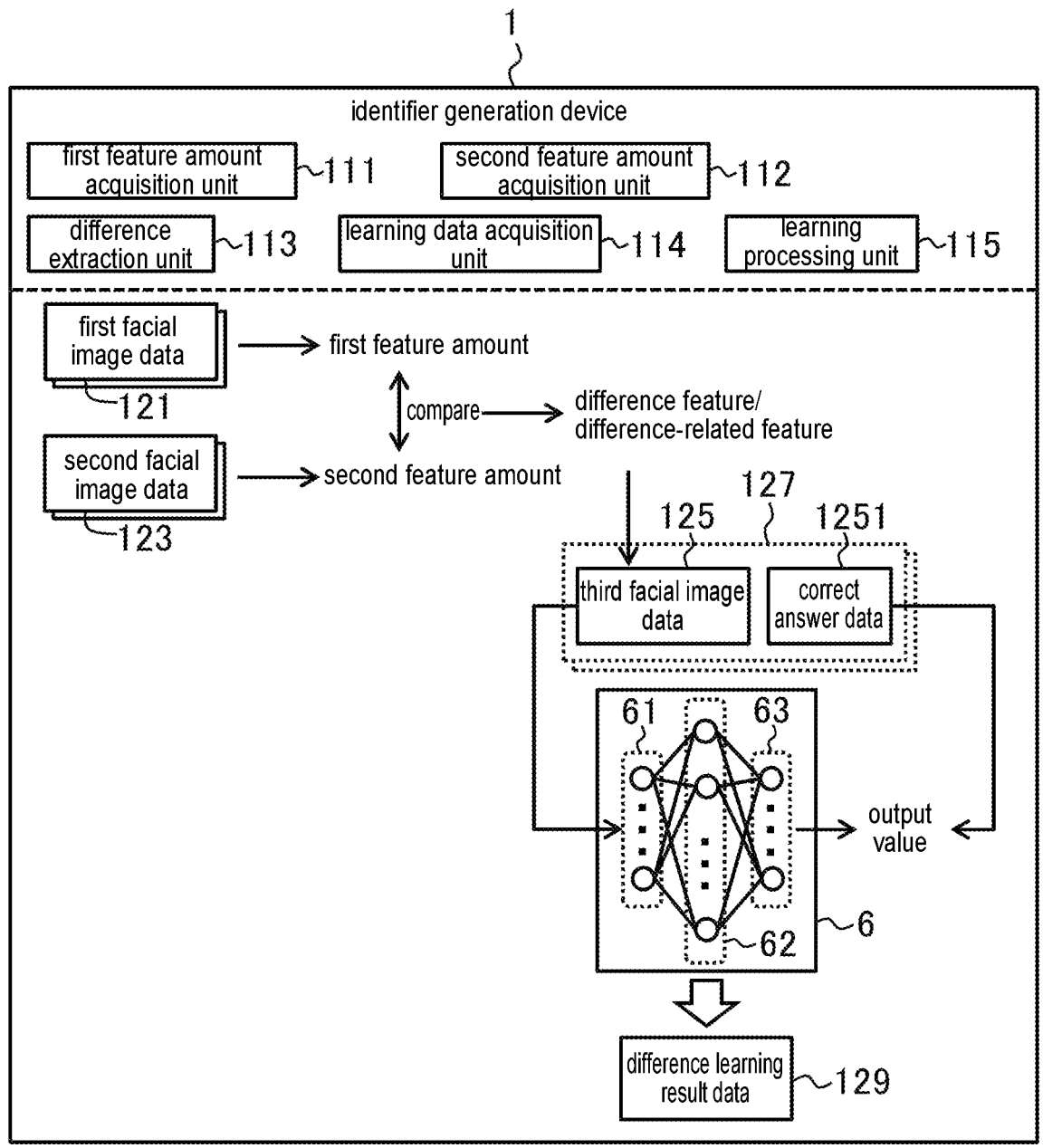
FIG. 4 schematically illustrates an example of the software configuration of the identifier generation device according to an embodiment.

[Software Configuration]
<Identifier Generation Device>
Next, an example of the software configuration of the identifier generation device 1 according to the present embodiment is described using FIG. 4. FIG. 4 schematically illustrates an example of the software configuration of the identifier generation device 1 according to the present embodiment.

The control unit 11 of the identifier generation device 1 expands, in the RAM, the generation program 81 stored in the storage unit 12. Then, the control unit 11 interprets and executes the generation program 81 expanded in the RAM by the CPU to control the constituent elements. Thereby, as shown in FIG. 4, the identifier generation device 1 according to the present embodiment operates as a computer including, as software modules, a first feature amount acquisition unit 111, a second feature amount acquisition unit 112, a difference extraction unit 113, a learning data acquisition unit 114, and a learning processing unit 115.

The first feature amount acquisition unit 111 acquires the first feature amount related to each feature and calculated from the first facial image data 121 used in machine learning that constructs the first identifier 5 so as to identify a plurality of features of the face. The second feature amount acquisition unit 112 acquires the second feature amount related to each feature and calculated from the second facial image data 123 in which a plurality of features of the face is reflected, the second feature amount being acquired in the environment in which the first identifier 5 is used and the second facial image data 123 being the same type as the first facial image data 121. The difference extraction unit 113 compares the first feature amount and the second feature amount for each feature, and extracts, based on the result of the comparison and among the plurality of features, the feature having a size in which the difference between the first feature amount and the second feature amount satisfies a predetermined condition as a difference feature.

The learning data acquisition unit 114 acquires the third facial image data 125 in which at least one of the difference feature and the difference-related feature is reflected in the environment in which the first identifier 5 is used. The learning processing unit 115 constructs the second identifier 6 that identifies at least one of the difference feature and the difference-related feature from the third facial image data 125 by machine learning in which the third facial image data 125 is used. As shown in FIG. 4, in the present embodiment, the second identifier 6 is configured of a neural network. Therefore, in order to perform the machine learning (that is, supervised learning) of the neural network, the learning data acquisition unit 114 acquires learning data set 127 configured by the combination of the third facial image data 125 and correct answer data 1251. The correct answer data 1251 is configured to indicate a correct answer to the identification of at least one of the difference feature and the difference-related feature reflected in the third facial image data 125. Then, the learning processing unit 115 performs the supervised learning in which the learning data set 127 are used to construct the trained second identifier 6 which has acquired the ability to identify at least one of the difference feature and the difference-related feature.

(Identifier)
Next, the configuration of the second identifier 6 is described. As shown in FIG. 4, the second identifier 6 according to the present embodiment is configured of a neural network. Specifically, the second identifier 6 is configured of a neural network having a multilayer structure used for so-called deep learning, and includes an input layer 61, an intermediate layer (hidden layer) 62, and an output layer 63.

Moreover, in the example of FIG. 4, the neural network that constitutes the second identifier 6 includes one intermediate layer 62, the output of the input layer 61 is input to the intermediate layer 62, and the output of the intermediate layer 62 is input to the output layer 63. However, the number of the intermediate layer 62 is not limited to one. The second identifier 6 may include two or more intermediate layers 62.

Each of the layers 61 to 63 includes one or a plurality of neurons. For example, the number of neurons in the input layer 61 may be set according to the third facial image data 125. The number of neurons in the intermediate layer 62 may be appropriately set according to the embodiment. In addition, the number of neurons in the output layer 63 may be set according to the number of features (difference features and/or difference-related features) to be identified, the number of types of correct answer, and the like.

The neurons in adjacent layers are appropriately connected to each other, and a weight (connection weight) is set for each connection. In the example of FIG. 4, each neuron is connected to all neurons in the adjacent layer. However, the connection of the neurons is not limited to the above example and may be set appropriately according to the embodiment.

A threshold value is set for each neuron, and basically, the output of each neuron is determined by whether the sum of products of each input and each weight exceeds the threshold value. When the third facial image data 125 of the learning data set 127 is input to the input layer 61, the learning processing unit 115 constructs the trained second identifier 6 which outputs, from the output layer 63, a value corresponding to the correct answer data 1251 associated with the input third facial image data 125. Then, the learning processing unit 115 stores the information indicating the configuration of the constructed trained second identifier 6 (for example, the number of layers of the neural network, the number of neurons in each layer, the connection relationship between neurons, the transfer function of each neuron), the weight of connection between the neurons and the threshold value of each neuron in the storage unit 12 as the difference learning result data 129.

<Identification Device>

Figure 5:
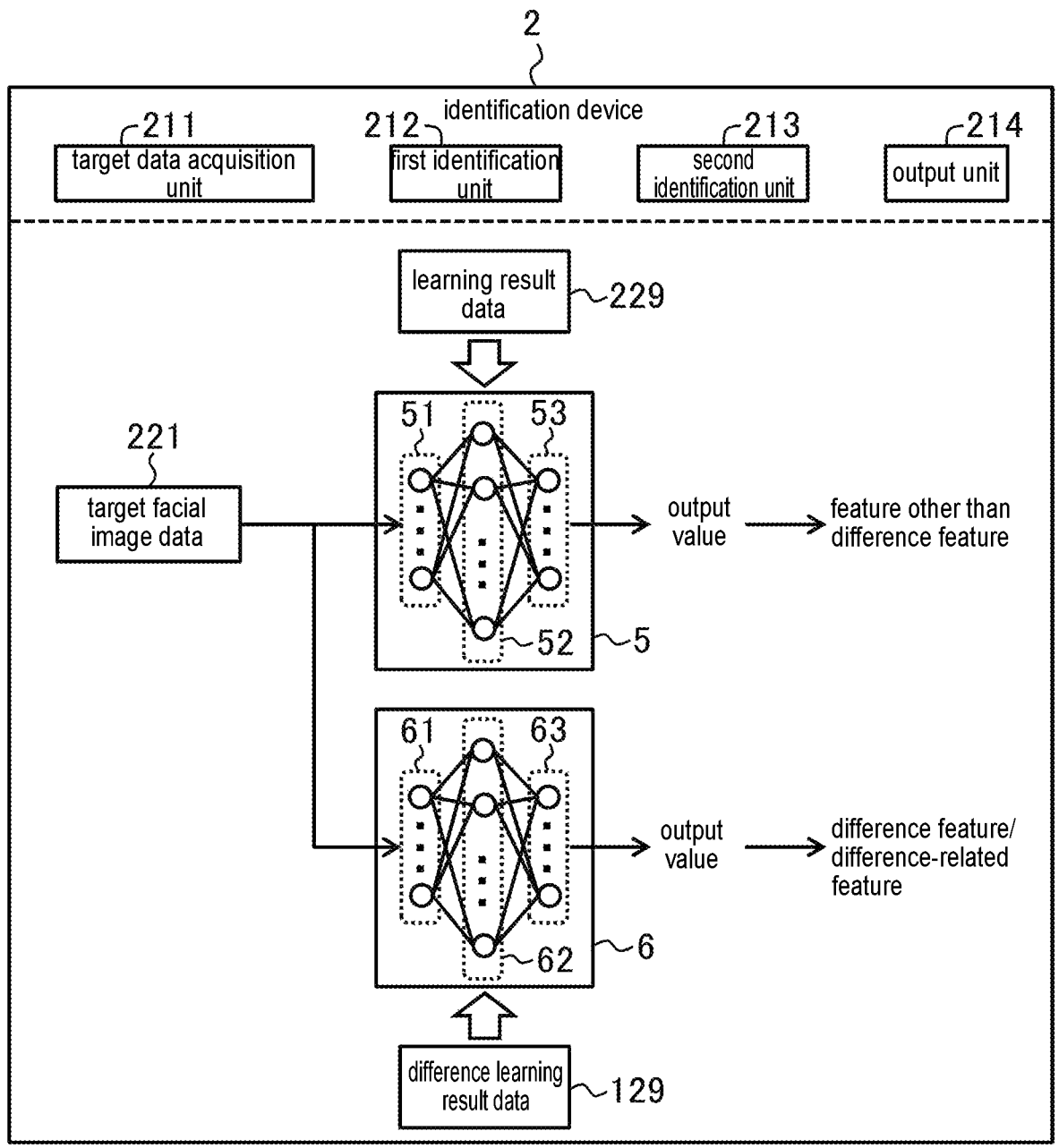
FIG. 5 schematically illustrates an example of the software configuration of the identification device according to the embodiment.

Next, an example of the software configuration of the identification device 2 according to the present embodiment is described using FIG. 5. FIG. 5 schematically illustrates an example of the software configuration of the identification device 2 according to the present embodiment.

The control unit 21 of the identification device 2 expands, in the RAM, the identification program 82 stored in the storage unit 22. Then, the control unit 21 interprets and executes the identification program 82 expanded in the RAM by the CPU to control each constituent element. Thereby, as shown in FIG. 5, the identification device 2 according to the present embodiment is configured as a computer including, as software modules, the target data acquisition unit 211, the first identification unit 212, the second identification unit 213, and the output unit 214.

The target data acquisition unit 211 acquires target facial image data 221 that is a target for identifying a plurality of features. For example, the target facial image data 221 is acquired by capturing the face of the target person X with the camera 31. The first identification unit 212 includes the trained first identifier 5, and inputs the acquired target facial image data 221 to the first identifier 5 to thereby acquire, from the first identifier 5, an output value corresponding to the result obtained by identifying a plurality of features from the target facial image data 221. The second identification unit 213 includes the trained second identifier 6, and inputs the acquired target facial image data 221 to the second identifier 6 to thereby acquire, from the second identifier 6, an output value corresponding to the result obtained by identifying a plurality of features from the target facial image data 221. The output unit 214 outputs, based on the output value of the first identifier 5 and the output value of the second identifier 6, the result obtained by identifying a plurality of features from the target facial image data 221.

Moreover, as shown in FIG. 5, the first identifier 5 according to the present embodiment is configured of a neural network in the same manner as the second identifier 6. The neural network of the first identifier 5 may be configured similarly to the second identifier 6. That is, an input layer 51, an intermediate layer (hidden layer) 52, and an output layer 53 may be configured similarly to the layers 61 to 63 of the second identifier 6. However, the structure of the neural network of the first identifier 5 may not be identical to that of the second identifier 6. For example, the number of the layers of the neural network constituting the first identifier 5, the number of neurons in each layer, and the connection relationship between neurons may be different from those of the neural network constituting the second identifier 6.

The information indicating the configuration of the trained first identifier 5 (for example, the number of layers in each network, the number of neurons in each layer, the connection relationship between neurons, the transfer function of each neuron), the weight of connection between neurons, and the threshold value of each neuron is included in the learning result data 229. The first identification unit 212 refers to the learning result data 229 to set the trained first identifier 5. Similarly, the second identification unit 213 refers to the difference learning result data 129 to set the trained second identifier 6.

<Others>

Each software module of the identifier generator 1 and the identification device 2 is described in detail in an operation example described later. Moreover, in the present embodiment, an example in which each software module of the identifier generation device 1 and the identification device 2 is realized by a general-purpose CPU is described. However, some or all of the above software modules may be implemented by one or a plurality of dedicated processors. In addition, relating to the respective software configurations of the identifier generation device 1 and the identification device 2, the software module may be omitted, replaced, and added as appropriate according to the embodiment.

§ 3 Operation Example

[Identifier Generation Device]

Figure 6:
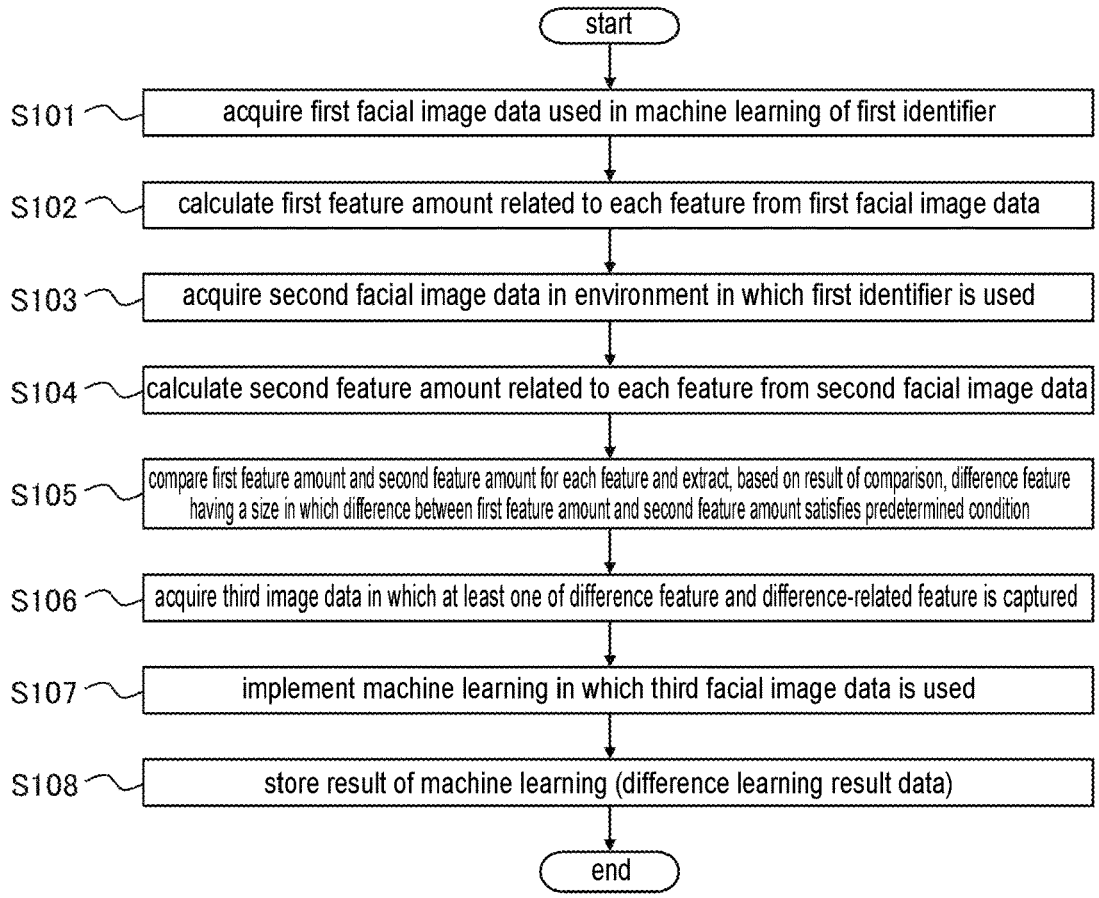
FIG. 6 illustrates an example of the processing procedure of the identifier generation device according to the embodiment.

Next, an operation example of the identifier generation device 1 is described using FIG. 6. FIG. 6 is a flowchart illustrating an example of the processing procedure of the identifier generation device 1. The processing procedure described below is an example of the identifier generation method. However, the processing procedure described below is merely an example, and each processing may be changed as much as possible. In addition, in the processing procedure described below, steps can be omitted, replaced, and added as appropriate according to the embodiment.

(Step S101 and S102)

In step S101, the control unit 11 operates as the first feature amount acquisition unit 111, and acquires the first facial image data 121 used for the machine learning for constructing the first identifier 5 so as to identify a plurality of features of a face. In step S102, the control unit 11 operates as the first feature amount acquisition unit 111 and calculates the first feature amount related to each feature from the acquired first facial image data 121.

The acquisition source of the first facial image data 121 is not particularly limited and may be appropriately determined according to the embodiment. For example, when the trained first identifier 5 is constructed by the identifier generation device 1, the control unit 11 may stores the first facial image data 121 used for the machine learning of the first identifier 5 in the storage region such as the storage unit 12, network attached storage (NAS), and the like. In this case, the control unit 11 can acquire the first facial image data 121 from the storage region. In addition, for example, the trained first identifier 5 may be constructed by another information processing device different from the identifier generation device 1. In this case, the control unit 11 can acquire the first facial image data 121 via a network, the storage medium 91, or the like.

Moreover, the trained first identifier 5 can be constructed by machine learning processing which is the same as the processing (steps S107 and S108) described later for constructing the trained second identifier 6 except that the learning data set to be used is different. The learning data set used for the machine learning of the first identifier 5 is configured of, for example, combination of the first facial image data 121 and correct answer data indicating the correct answer of each feature of the face reflected in the first facial image data 121. The content of the correct answer data may be appropriately determined according to the mode for identifying the features described later. By performing the machine learning in which the above learning data set is used, the identifier generation device 1 or another information processing device can generate the first identifier 5 that has acquired the ability to identify a plurality of features of a face.

In addition, the number of the first facial image data 121 acquired in step S101 may not be particularly limited, and may be appropriately determined by, for example, the degree at which the tendency of each feature reflected in the data used for the machine learning of the first identifier 5 is represented. The first facial image data 121 acquired in step S101 may be all of the data used for the machine learning or a part of the data used for the machine learning.

In addition, the plurality of features of the face to be identified by the first identifier 5 may be selected from, for example, the type of facial expression, the position of a facial part, the shape of a facial part, the color of a facial part, and the state of a facial part. The "type of facial expression" may correspond to the type of emotion such as happiness, anger, sadness, and comfort, or may correspond to the type of state of the target person such as a tired face. The "facial part" may include, for example, organs such as eyes, nose, mouth, and ears, or may include a part of the face such as contour and hairstyle. The "position of facial part" may include the relative positions of the individual parts on the face, or may include the relative positional relationship between specific parts (for example, the positional relationship between the two eyes). The "state of facial part" may include attribute values of individual parts such as the opening degree of eyes, the opening degree of mouth, the angle of eyes, and the angle of mouth corners. The attribute value may be expressed by stage (grade, level) or a numerical value (score). When the opening degree of eyes is expressed with multiple levels, for example, level "0" may indicate closed eyes, level "1" may indicate slightly opened eyes (small opening degree), level "2" may indicate normally opened eyes (normal opening degree), and level "3" may indicate widely opened eyes (large opening degree).

In addition, the first feature amount calculated in step S102 is a numerical representation of each feature of the face. The type of the first feature amount is not particularly limited and may be appropriately determined according to each feature of the face to be identified. The first feature amount may be, for example, the size of a facial part, the width between specific parts, the angle of a specific part, the color of a specific part, and the like. As a specific example, the first feature amount may be the vertical width of the eyes, the opening state of the eye, the distance between the eyebrows and the eyes, the width between the eyebrows, the angle of the mouth corner, the pixel value of the eyes, and the like. In step S102, the control unit 11 can calculate the first feature amount related to each feature by performing known image processing such as pattern matching and edge extraction on the first facial image data 121.

Accordingly, the control unit 11 acquires the first feature amount related to each feature and calculated from the first facial image data 121. In step S101, when a plurality of first facial image data 121 is acquired, the control unit 11 can acquire the distribution of the first feature amount related to the first feature amount by calculating the first feature amount from each of the plurality of first facial image data 121. When the first feature amount is acquired, the control unit 11 advances the processing to the next step S103.

(Steps S103 and S104)

In step S103, the control unit 11 operates as the second feature amount acquisition unit 112, and acquires, in the environment in which the first identifier 5 is used, the second facial image data 123 which is the same type as the first facial image data 121 and in which a plurality of facial features is reflected. In step S104, the control unit 11 operates as the second feature amount acquisition unit 112 and calculates the second feature amount related to each feature from the acquired second facial image data 123.

The method for acquiring the second facial image data 123 is not particularly limited and may be appropriately determined according to the embodiment. For example, in an environment in which a camera is prepared and the first identifier 5 is used, the facial image data in which a plurality of features of the face of the target person may be acquired by capturing images of one or a plurality of target person with the prepared camera. The facial image data may be directly used as the second facial image data 123.

In addition, the second facial image data 123 may be selected from the facial image data out of the acquired facial image data in which at least one of the plurality of features is not identifiable or is erroneously identified by the first identifier 5. In this case, similar to step S202 described later, the first identifier 5 is used to perform processing of identifying a plurality of features of the face on the acquired facial image data. That is, the first identifier 5 is set based on the learning result data 229, and the obtained facial image data is input to the first identifier 5 to perform the arithmetic processing of the first identifier 5. Accordingly, the output value corresponding to the result obtained by identifying a plurality of features from the facial image data can be acquired from the first identifier 5. Based on the output value, it is possible to determine whether at least one of the plurality of features is not identifiable or is erroneously identified by the first identifier 5. Then, the second facial image data 123 may be appropriately selected from the facial image data for which it is determined that at least one of the plurality of features is not identifiable or is erroneously identified by the first identifier 5.

The processing of using a camera to acquire the facial image data, the processing of identifying a plurality of features included in the facial image data by the first identifier 5, and the processing of selecting the second facial image data 123 may all be performed by the identifier generation device 1. In this case, the storage unit 12 may store the learning result data 229, and the control unit 11 may acquire the second facial image data 123 by executing each processing according to the operation on the input device 14 by the operator. In addition, the control unit 11 may automatically acquire the second facial image data 123 by the processing of the generation program 81.

Alternatively, at least one of the processing of using a camera to acquire the facial image data, the processing of identifying a plurality of features included in the facial image data by the first identifier 5, and the processing of selecting the second facial image data 123 may be performed by another information processing device other than the identifier generation device 1, such as the identification device 2. In this case, the control unit 11 may acquire the second facial image data 123 from another information processing device via the network, the storage medium 91, or the like.

In addition, the number of the second facial image data 123 acquired in step S103 may not be particularly limited. For example, the number may be appropriately determined by the degree at which the tendency of each of the features reflected in the facial image data obtained in the environment in which the first identifier is used 5 is represented. The second feature amount calculated in step S104 is of the same type as the first feature amount calculated in step S102. The control unit 11 can calculate the second feature amount related to each feature from the second facial image data 123 by the same processing as in step S102 described above.

Accordingly, the control unit 11 acquires the second feature amount related to each feature and calculated from the second facial image data 123. In step S103, when a plurality of second facial image data 123 is acquired, the control unit 11 can acquire the distribution of the second feature amount related to each feature by calculating the second feature amount from each of the plurality of second facial image data 123. When the second feature amount is acquired, the control unit 11 advances the processing to the next step S105.

(Step S105)

In step S105, the control unit 11 operates as the difference extraction unit 113 and compares the first feature amount and the second feature amount for each feature. Then, the control unit 11 extracts, based on the result of the comparison and among the plurality of features of the face to be identified, the feature which has a size that the difference between the first feature amount and the second feature amount satisfies a predetermined condition as the difference feature. When the difference feature is extracted, the control unit 11 advances the processing to the next step S106.

Moreover, the method for comparing the first feature amount and the second feature amount may be appropriately determined according to the embodiment. When the distribution of the first feature amount and the distribution of the second feature amount are acquired by the above steps S102 and S104, the control unit 11 may calculate the difference between the distribution of the first feature amount and the distribution of the second feature amount as the difference between the first feature amount and the second feature amount. The difference in distribution may be calculated using an index such as the average value, the median value, the variance, and the Euclidean distance. For example, the control unit 11 may calculate, for each feature, the average value of each of the acquired distribution of the first feature amount and distribution of the second feature amount, and calculate the difference between the calculated average values of the distributions as the difference of the first feature amount and the second feature amount. The same applies to other indexes.

In addition, the method for selecting a feature having a size that satisfies a predetermined condition may be appropriately set according to the embodiment. For example, the predetermined condition may be defined so that one or a plurality of features is selected in order from the feature having the largest difference. In this case, the control unit 11 may select, among the plurality of features of the face to be identified, one or a plurality of features in order from the feature having the largest difference between the first feature amount and the second feature amount as features having a size that satisfies a predetermined condition, and may extract the selected one or a plurality of features as the difference feature. In addition, for example, the predetermined condition may be defined so that a feature in which the difference exceeds a threshold value is selected. In this case, the control unit 11 may determine, for each feature of the face to be identified, whether the difference between the first feature amount and the second feature amount exceeds the threshold value, and extract the feature in which the difference between the first feature amount and the second feature amount exceeds the threshold value as the difference feature. In this case, the threshold value may be a value different for each feature or the same value.

By the processing of step S105, the facial feature that may differ greatly due to environmental changes and that are highly likely to not be accurately identified by the first identifier 5 are extracted as difference features. For example, a scene is assumed in which there are first and second countries in which the average eye attribute of each citizen differs greatly, and the first identifier 5 constructed to identify the facial features of the target person in the first country is used in the second country. In this case, the first identifier 5 may not be able to properly identify the eye-related features from the facial image data obtained in the second country, and the eye-related features may be extracted as the difference features in step S105.

(Step S106)

In step S106, the control unit 11 operates as the learning data acquisition unit 114 and acquires the third facial image data 125 in which at least one of the difference feature and the difference-related feature is reflected in the environment in which the first identifier 5 is used.

In this embodiment, first, the control unit 11 selects a feature to be identified by the newly constructed second identifier 6. The feature to be identified by the second identifier 6 is selected from the difference feature extracted in step S105 and the difference-related feature related to this difference feature. The difference-related feature is not particularly limited as long directly a feature related to the difference feature, and may be appropriately selected according to the embodiment. For example, when the difference feature extracted in step S105 is an eye-related feature, such as the size of the eyes and the shape of the eyes, the difference-related feature may be the distance between the eyes, the distance between the eyes and the eyebrows, the shape of the eyebrows, and the size of the eyebrows, which is a feature not completely identical with the difference feature but having a relationship with the eye-related feature. The difference-related feature may be any one of the plurality of features to be identified by the first identifier 5, or may be a feature other than the plurality of features to be identified by the first identifier 5.

When the difference-related feature is a feature other than the plurality of features to be identified by the first identifier 5, the identifier generation device 1 stores, in the storage unit 12 in advance, information that indicates candidates of the difference-related feature for each feature of the face. The control unit 11 may specify the difference-related feature by referring to the information. In addition, when the information related to the difference-related feature is not stored in the storage unit 12 in advance, the control unit 11 may accept the designation or setting of the difference-related feature performed by the operator via the input device 14. The method of designating the difference-related feature may be appropriately determined according to the embodiment.

In addition, the feature to be identified by the second identifier 6 may be appropriately selected. The control unit 11 may select the feature to be identified by the second identifier 6 according to the operation on the input device 14 by the operator. Alternatively, the control unit 11 may select the feature to be identified by the second identifier 6 according to a predetermined criterion. Moreover, from the viewpoint of further improving the precision of identifying the facial features, it is preferable to select the difference feature or the difference feature and the difference-related feature as the feature to be identified by the second identifier 6.

Next, the control unit 11 acquires the third facial image data 125 in which at least one of the difference feature and the difference-related feature selected as the feature to be identified by the second identifier 6 is reflected. In the present embodiment, the control unit 11 acquires the learning data set 127 configured of pairs of the third facial image data 125 and the correct answer data 1251.

The learning data set 127 may be appropriately generated. For example, in the environment in which a camera is prepared and the first identifier 5 is used, the prepared camera captures images of at least one of the difference feature and the difference-related feature of the face of one or more target person, thereby acquiring the third facial image data 125 in which at least one of the difference feature and the difference-related feature is reflected. Then, the obtained third facial image data 125 is combined with the correct answer data 1251 indicating the correct answer for the identification of at least one of the difference feature and the difference-related feature reflected in the third facial image data 125. The content of the correct answer data 1251 may be appropriately determined according to the mode described later for identifying the feature. Thereby, the learning data set 127 can be generated.

The generation of the learning data set 127 may be performed by the identifier generation device 1. In this case, the control unit 11 may generate the learning data set 127 according to the operation on the input device 14 by the operator. In addition, the control unit 11 may automatically generate the learning data set 127 by the processing of the generation program 81. By executing the generation processing, the control unit 11 can acquire the learning data set 127 in step S106.

Alternatively, the learning data set 127 may be generated by another information processing device other than the identifier generation device 1. In another information processing device, the learning data set 127 may be manually generated by the operator, or may be automatically generated by the processing of a program. In this case, in step S106, the control unit 11 may acquire the learning data set 127 generated by another information processing device via a network, the storage medium 91, or the like.

Moreover, in the third facial image data 125 included in the acquired learning data set 127, a feature other than the difference feature and the difference-related feature may be reflected as long as at least one of the difference feature and the difference-related feature of the face selected as the feature to be identified by the second identifier 6 is reflected. For example, when the features relating to the eyes are extracted as the difference features, the third facial image data 125 may be partial facial image data in which only the eye portion is extracted, or may be a facial image including portions other than the eye portion.

In addition, the method of acquiring the third facial image data 125 may not be limited to the example of newly acquiring the data using the camera as described above. The third facial image data 125 may be acquired from the second facial image data 123. For example, the third facial image data 125 may be configured of a copy of the second facial image data 123, or configured of partial facial image obtained by extracting, from the second facial image data 123, the part in which at least one of the difference feature and the difference-related feature is reflected. In this case, the identifier generation device 1 or another information processing device may directly acquire the second facial image data 123 as the third facial image data 125, or acquire the third facial image data 125 by extracting, from the second facial image data 123, the part in which at least one of the difference feature and the difference-related feature is reflected.

The number of the learning data set 127 acquired in step S106 may be appropriately determined according to the embodiment, for example, appropriately determined so that the machine learning of the second identifier 6 can be performed. Accordingly, when the learning data set 127 configured of pairs of the third facial image data 125 and the correct answer data 1251 is acquired, the control unit 11 advances the processing to the next step S107.

(Step S107)

In step S107, the control unit 11 operates as the learning processing unit 115 and constructs the second identifier 6 for identifying at least one of the difference feature and the difference-related feature from the third facial image data 125 by machine learning in which the third facial image data 125 acquired in step S106 is used. In the present embodiment, the control unit 11 uses the learning data set 127 to implement the machine learning of the neural network in order that an output value corresponding to the correct answer data 1251 is output from the output layer 63 when the third facial image data 125 is input to the input layer 61.

Specifically, first, the control unit 11 prepares a neural network (the second identifier 6 before learning) to be subjected to learning processing. The configuration of the prepared neural network, the initial value of the connection weight between neurons, and the initial value of the threshold value of each neuron may be given by a template or may be given by the input of the operator.

Next, the control unit 11 uses the third facial image data 125 included in the learning data set 127 acquired in step S107 as input data and uses the correct answer data 1251 as teacher data to execute the learning processing of the neural network. The stochastic gradient descent method or the like may be used for the learning processing of the neural network.

For example, the control unit 11 inputs the third facial image data 125 to the input layer 61, and sequentially performs firing determination of each neuron included in each of the layers 61 to 63 from the input side. Accordingly, the control unit 11 obtains the output value from the output layer 63. Next, the control unit 11 calculates the error between the output value obtained from the output layer 63 and the value corresponding to the correct answer of the identification indicated by the correct answer data 1251. Subsequently, the control unit 11 uses the error of the calculated output value to calculate the error of the connection weight between neurons and the error of the threshold value of each neuron by back propagation. Then, the control unit 11 updates the value of the connection weight between neurons and the value of the threshold value of each neuron based on each of the calculated errors.

The control unit 11 repeats this series of processing for each learning data set 127 until the output value output from the neural network is identical with the value corresponding to the correct answer of the identification indicated by the correct answer data 1251. Thereby, the control unit 11 can construct the trained second identifier 6 which outputs the output value corresponding to the correct answer for the identification of at least one of the difference feature and the difference-related feature indicated by the correct answer data 1251 when the third facial image data 125 is input. For example, when the eye-related features are extracted as the difference features, the second identifier 6 that has acquired the ability to identify the eye-related features in the facial image data can be constructed. When the learning processing of the second identifier 6 is completed, the control unit 11 advances the processing to the next step S108.

Moreover, a case is assumed in which the difference feature is extracted by comparison with the threshold value in the above step S105. In this case, in the step S106, the control unit 11 may determine whether the difference between the first feature amount and the second feature amount is larger than a second threshold value, the second threshold value being larger than the threshold value (also referred to as first threshold value) used for extracting the difference feature. Then, when it is determined that the difference between the first feature amount and the second feature amount is larger than the second threshold value, the control unit 11 may select the difference feature and the difference-related feature as the feature to be identified by the second identifier 6. On the other hand, when it is determined that the difference between the first feature amount and the second feature amount is not larger than the second threshold value, the control unit 11 may select the difference feature or the difference-related feature as the feature to be identified by the second identifier 6. Accordingly, in step 107, when it is determined that the difference between the first feature amount and the second feature amount is very large, that is, the environmental change is very large, the control unit 11 can construct a second identifier 6 which identifies not only the difference feature that is affected by the change but also the difference-related feature. According to the second identifier 6, the identification result of the difference feature can be reinforced by the identification result of the difference-related feature, and thus the performance of identifying a plurality of features from the facial image can be improved.

(Step S108)

In step S108, the control unit 11 operates as the learning processing unit 115 and stores the information indicating the configuration of the second identifier 6 constructed by machine learning, the weight of connection between neurons, and the threshold value of each neuron in the storage unit 12 as the difference learning result data 129. Accordingly, the control unit 11 ends the processing of this operation example.

The control unit 11 may transfer the created difference learning result data 129 to the identification device 2 after the processing of step S108 is completed. In addition, the control unit 11 may periodically update the difference learning result data 129 by periodically performing the processing of the above steps S101 to S108. Besides, the control unit 11 may periodically update the difference learning result data 129 held by the identification device 2 by transferring the created difference learning result data 129 to the identification device 2 each time the learning processing is executed. In addition, for example, the control unit 11 may store the created difference learning result data 129 in a data server such as NAS. In this case, the identification device 2 may acquire the difference learning result data 129 from this data server. In addition, the difference learning result data 129 created by the identifier generation device 1 may be incorporated into the identification device 2 in advance.

[Identification Device]

Figure 7:
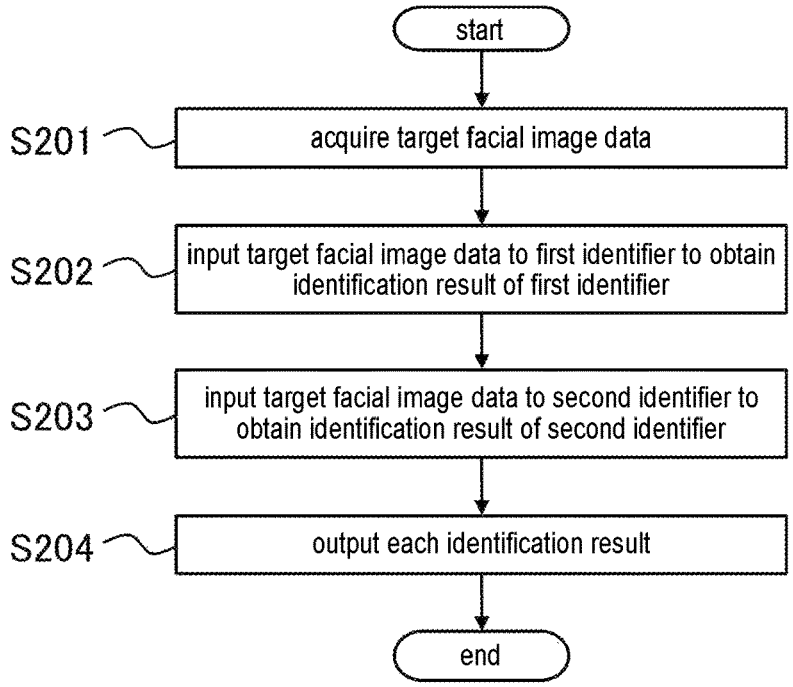
FIG. 7 illustrates an example of the processing procedure of the identification device according to the embodiment.

Next, an operation example of the identification device 2 is described using FIG. 7. FIG. 7 is a flow chart illustrating an example of the processing procedure of the identification device 2. However, the processing procedure described below is merely an example, and each processing may be changed as much as possible. In addition, in the processing procedure described below, steps can be omitted, replaced, and added as appropriate according to the embodiment.

(Step S201)

In step S201, the control unit 21 operates as the target data acquisition unit 211 and acquires the target facial image data 221 that is a target for identifying a plurality of features. The target facial image data 221 may be moving image data or still image data.

In the present embodiment, the identification device 2 is connected to the camera 31 via the external interface 24. Therefore, the control unit 21 acquires, by the camera 31, the target facial image data 221 in which the face of the target person X is reflected. When the target facial image data 221 is acquired, the control unit 21 advances the processing to the next step S202.

However, the route for acquiring the target facial image data 221 is not limited to the above example and may be appropriately selected according to the embodiment. For example, another information processing device different from the identification device 2 may be connected to the camera 31. In this case, the identification device 2 may acquire the target facial image data 221 by receiving the transmission of the target facial image data 221 from another information processing device.

(Step S202)

In step S202, the control unit 21 operates as the first identification unit 212, inputs the acquired target facial image data 221 to the first identifier 5, and executes the arithmetic processing of the first identifier 5. Thereby, the control unit 21 acquires from the first identifier 5 an output corresponding to the result obtained by identifying a plurality of features of the face from the target facial image data 221.

Specifically, the control unit 21 refers to the learning result data 229 to set the trained first identifier 5. Next, the control unit 21 inputs the target facial image data 221 acquired in step S201 to the input layer 51 of the first identifier 5. Then, the control unit 21 sequentially performs the firing determination of each neuron included in each of the layers 51 to 53 from the input side. Thereby, the control unit 21 acquires, from the output layer 53, the output value corresponding to the result obtained by identifying the plurality of features of the face from the target facial image data 221. When the output value is acquired from the first identifier 5, the control unit 21 advances the processing to the next step S203.

(Step S203)

In step S203, the control unit 21 operates as the second identification unit 213, inputs the acquired target facial image data 221 to the second identifier 6, and executes the arithmetic processing of the second identifier 6. Thereby, the control unit 21 acquires, by the second identifier 6, an output corresponding to the result obtained by identifying at least one of the difference feature and the difference-related feature from the target facial image data 221.

Specifically, the control unit 21 refers to the difference learning result data 129 to set the trained second identifier 6.

Next, the control unit 21 inputs the target facial image data 221 acquired in step S201 into the input layer 61 of the second identifier 6.

Here, in steps S106 and S107, the second facial image data 123 or the facial image data obtained by the camera is directly used as the third facial image data 125 in the machine learning of the second identifier 6. When the second identifier 6 constructed by this machine learning is used, the control unit 21 may directly input the target facial image data 221 to the input layer 61 of the second identifier 6.

On the other hand, in steps S106 and S107, the partial facial image data extracted from the second facial image data 123 or the partial facial image data extracted from the facial image data obtained by the camera may be used as the third facial image data 125 in the machine learning of the second identifier 6. When the second identifier 6 constructed by this machine learning is used, the control unit 21 may extract, by known image processing such as pattern matching and from the target facial image data 221, partial facial image data in which at least one of the difference feature and the difference-related feature to be identified is reflected, and input the extracted partial facial image data to the input layer 61 of the second identifier 6.

Then, the control unit 21 sequentially performs the firing determination of each neuron included in each of the layers 61 to 63 from the input side. Thereby, the control unit 21 acquires, from the output layer 63, an output value corresponding to the result obtained by identifying at least one of the difference feature and the difference-related feature from the target facial image data 221. When the output value is acquired from the second identifier 6, the control unit 21 advances the processing to the next step S204.

(Step S204)

In step S204, the control unit 21 operates as the output unit 214 and outputs, based on the output value of the first identifier 5 and the output value of the second identifier 6, the result obtained by identifying a plurality of features from the target facial image data 221.

Here, identifying a feature may include any processing for identifying the type or the attribute value of the feature, such as determining one or a plurality of classes to which the feature belongs, determining whether the feature belongs to a predetermined class, deriving a probability or reliability at which the feature belongs to a predetermined class, deriving the attribute value of the feature, and the like. The format of the output value of each identifier (5, 6) may be appropriately determined according to the mode for identifying the feature.

As a specific example, the output value of each identifier (5, 6) may indicate, for example, the attribute value of each part such as the opening degree of the eyes, the opening degree of the mouth, the angle of the eyes, and the angle of the mouth. In this case, the control unit 21 can derive the attribute value of each feature by the arithmetic processing of each identifier (5, 6). That is, the control unit 21 can identify each feature of the face by obtaining the output value of each identifier (5, 6).

In addition, the output value of each identifier (5, 6) may indicate, for example, the probability or reliability at which the facial expression of the target person X is a specific type (for example, happiness). In this case, the control unit 21 can derive the probability or reliability at which the feature belongs to a predetermined class by the arithmetic processing of each identifier (5, 6). In addition, the control unit 21 can determine whether the feature belongs to a predetermined class by comparing the output value of each identifier (5, 6) with a threshold value.

In addition, the output value of each identifier (5, 6) may indicate, for example, the type of facial expression. In this case, reference information (not shown) in a table format or the like in which the output value obtained from each identifier (5, 6) is associated with the type of facial expression may be held in the storage unit 22. The control unit 21 can identify the type of facial expression corresponding to the output value obtained from each identifier (5, 6) by referring to the reference information. In other words, the control unit 21 can determine the class to which the feature belongs.

In addition, the output value of each identifier (5, 6) may indicate, for example, the probability or reliability at which the face of the target person X is in a specific alertness state. The alertness state is a state that appears on the face of the target person, and may include, for example, a state related to sleepiness, concentration, poor physical condition, and the like. The class related to the alertness state may be given according to an attribute (for example, presence or absence of sleepiness or the like), or may be given according to a degree (level) of the alertness state according to a predetermined definition. In this case, the control unit 21 can derive the probability or reliability at which the feature belongs to a predetermined class by the arithmetic processing of each identifier (5, 6). Alternatively, the control unit 21 can compare the output value of each identifier (5, 6) with the threshold value to thereby determine whether the feature belongs to a predetermined class, that is, whether the face of the target person X is in a specific alertness state.

In addition, the output value of each identifier (5, 6) may indicate, for example, the class of the alertness state. In this case, reference information (not shown) in a table format or the like in which the output value obtained from each identifier (5, 6) is associated with the alertness state class may be held in the storage unit 22. The control unit 21 can determine the class of the alertness state class corresponding to the output value obtained from each identifier (5, 6) by referring to the reference information.

Furthermore, the control unit 21 may further determine other features of the face by using the result obtained by identifying each feature of the face based on the output value of each identifier (5, 6). For example, the control unit 21 may identify the state of each part of the face of the target person X based on the output value of each identifier (5, 6). Besides, the control unit 21 may determine the facial expression of the target person X based on the result obtained by identifying the state of each part of the face of the target person X. In this case, reference information (not shown) in a table format or the like in which the state of each part of the face is associated with the facial expression may be held in the storage unit 22. By referring to the reference information, the control unit 21 can determine the facial expression of the target person X based on the result obtained by identifying the state of each part of the face of the target person X.

The format of outputting the result obtained by identifying a plurality of features may be appropriately determined according to the embodiment. For example, the control unit 21 may output the result obtained by identifying a feature other than the difference feature among the plurality of features of the face based on the output value of the first identifier 5, and output the result obtained by identifying at least one of the difference feature and the difference-related feature based on the output value of the second identifier 6. As a specific example, when the eye-related feature is extracted as the difference feature in the processing procedure of the identifier generation, the control unit 21 may identify the features other than the eye-related feature based on the output value of the first identifier 5, and identify at least one of the eye-related feature and the feature related to the eye-related feature based on the output value of the second identifier 6.

However, the output format of the identification result may not be limited to the above example. For example, the control unit 21 may directly output the output value of each identifier (5, 6) as the identification result of each feature. In addition, for example, the control unit 21 may output both the identification result of the difference feature obtained by the first identifier 5 and the identification result of the difference feature obtained by the second identifier 6.

The output destination of the identified result is not particularly limited and may be appropriately selected according to the embodiment. The control unit 21 may output the identification result of each feature to the output device 26 for example. In addition, the control unit 21 may output the identification result of each feature to another information processing device such as a user terminal. Accordingly, when the output of the identification result is completed, the control unit 21 ends the processing of this operation example.

[Feature]

As described above, in the present embodiment, by the processing of steps S101 to S105, facial features that differ greatly in the environment in which the first facial image data 121 used to construct the first identifier 5 is collected and the environment in which the first identifier 5 is used can be extracted as difference features. Then, by the processing of steps S106 to S108, the second identifier 6 for identifying at least one of the difference feature and the difference-related feature can be generated. By using the second identifier 6 in the identification processing of the identification device 2, the deterioration of the identification performance for the difference feature can be suppressed. In addition, as for the cost of generating the second identifier 6, the target to be identified is limited to at least one of the difference feature and the difference-related feature of the face, and the cost is corresponding lower than the cost in the case that a separate identifier that identifies all the facial features is generated. That is, instead of discarding the first identifier 5 and generating a new identifier, the first identifier 5 can be used directly to identify facial features other than the difference feature, and the cost to cope with environmental changes can be suppressed correspondingly. In particular, the processing time of the machine learning of the second identifier 6 in step S107 can be shortened. Therefore, according to the present embodiment, it is possible to suppress, with a low cost method, deterioration in the performance of identifying a plurality of features from a facial image caused by environmental changes.

In addition, in the present embodiment, in step S103 described above, the identifier generation device 1 may selectively acquire the second facial image data 123 from the facial image data in which at least one of the plurality of features is not identifiable or is erroneously identified by the first identifier 5. Thereby, it is possible to appropriately extract, from the second facial image data 123, the difference features of the face which may greatly differ due to environmental changes. Therefore, according to the present embodiment, it is possible to appropriately suppress the deterioration of the identification performance caused by environmental changes.

In addition, in the present embodiment, in step S106 described above, the identifier generation device 1 may acquire the copy of the second facial image data 123 or the partial facial image data extracted from the second facial image data 123 as the third facial image data 125. Accordingly, it is possible to suppress the cost of collecting the third facial image data 125 used in the machine learning of the second identifier 6. Therefore, according to the present embodiment, it is possible to suppress, with a further low-cost method, deterioration in the performance of identifying a plurality of features from a facial image caused by environmental changes.

§ 4 Modification Example

Although the embodiments of the present invention have been described above in detail, the above description is merely an example of the present invention in all respects. It is evident that various improvements and modifications can be made without departing from the scope of the present invention. For example, the following changes are possible. In addition, in the following, the same reference sign is used for the same constituent element as the above embodiment, and the description about the same point as the above embodiment is appropriately omitted. The following modification examples can be combined as appropriate.

<4.1>

In the processing procedure of the identifier generation device 1 according to the above embodiment, in steps S101 and S102, the control unit 11 acquires the first facial image data 121, and calculates the first feature amount from the acquired first facial image data 121. Accordingly, the control unit 11 acquires the first feature amount related to each feature and calculated from the first facial image data 121. However, the method of acquiring the first feature amount is not limited to the above example. For example, the calculation of the first feature amount may be performed by another information processing device different from the identifier generation device 1. In this case, instead of executing steps S101 and S102, the control unit 11 may acquire the first feature amount calculated by another information processing device via a network, the storage medium 91, or the like.

Similarly, the calculation of the second feature amount may be performed by another information processing device different from the identifier generation device 1. In this case, instead of executing steps S103 and S104, the control unit 11 may acquire the second feature amount calculated by another information processing device via a network, the storage medium 91, or the like.

In addition, the timing of executing the processing of acquiring the first feature amount (steps S101 and S102) and the processing of acquiring the second feature amount (steps S103 and S104) is not limited to the example of the above processing procedure and may be determined appropriately according to the embodiment. For example, the control unit 11 may execute the processing of acquiring the first feature amount after executing the processing of acquiring the second feature amount.

In addition, in the processing procedure of the identification device 2 according to the above embodiment, the control unit 21 obtains the identification result of the first identifier 5 (step S202) and then obtains the identification result of the second identifier 6 (step S203). However, the timing of using each identifier (5, 6) may not be limited to the above example. The control unit 21 may execute the processing of step S203 to obtain the identification result of the second identifier 6, and then execute the processing of step S202 to obtain the identification result of the first identifier 5.

<4.2>

In the above embodiment, each identifier (5, 6) is configured of a fully connected neural network having a multilayer structure. However, the configuration of each identifier (5, 6) is not limited to the above example and may be appropriately selected according to the embodiment. For example, each identifier (5, 6) may be configured of a convolutional neural network, a recursive neural network, or the like.

<4.3>

In the above embodiment, a neural network is employed as the learning model for each identifier (5, 6). However, the learning model of each identifier (5, 6) is not limited to the above example and may be appropriately selected according to the embodiment. As the learning model of each identifier (5, 6), for example, a support vector machine, a self-organizing map, a learning model for performing machine learning by reinforcement learning, or the like may be employed.

<4.4>

In the above embodiment, the difference learning result data 129 and the learning result data 229 each include information indicating the configuration of the neural network. However, the configurations of the difference learning result data 129 and the learning result data 229 are not limited to the above example, and may be appropriately determined according to the embodiment as long as the data can be used for setting the trained identifier (5, 6). For example, when the configuration of the neural network to be used is common to all the devices, the difference learning result data 129 and the learning result data 229 may not include information indicating the configuration of the neural network.

<4.5>

The above embodiment shows an example in which the present invention is applied to a scene in which facial features are identified from facial image data. However, the applicable range of the present invention is not limited to the scene in which facial features are identified from facial image data. The present invention can be widely applied to a scene in which some feature is identified from image data.

Figure 8:
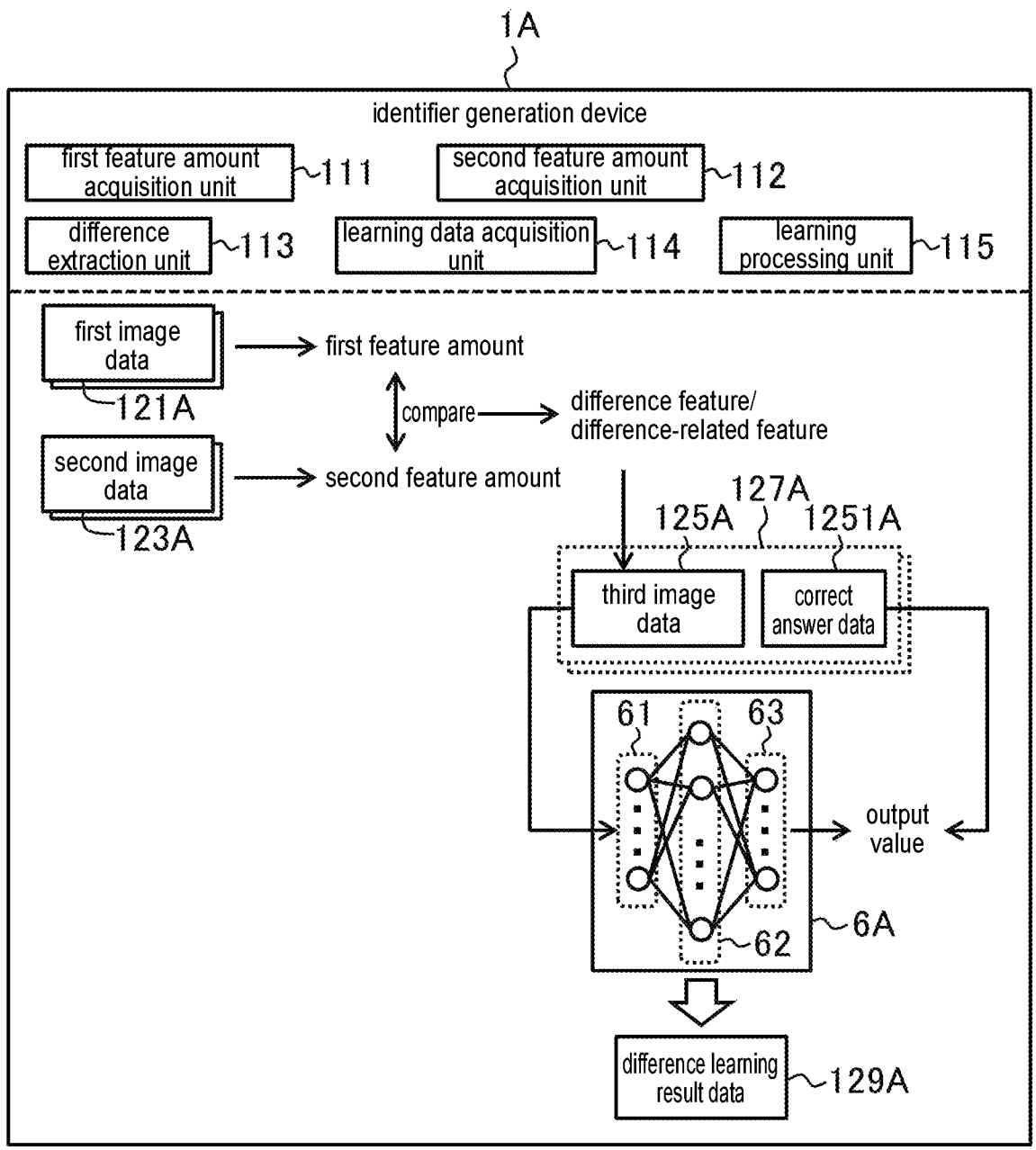
FIG. 8 schematically illustrates an example of the software configuration of an identifier generation device according to another embodiment.
Figure 9:
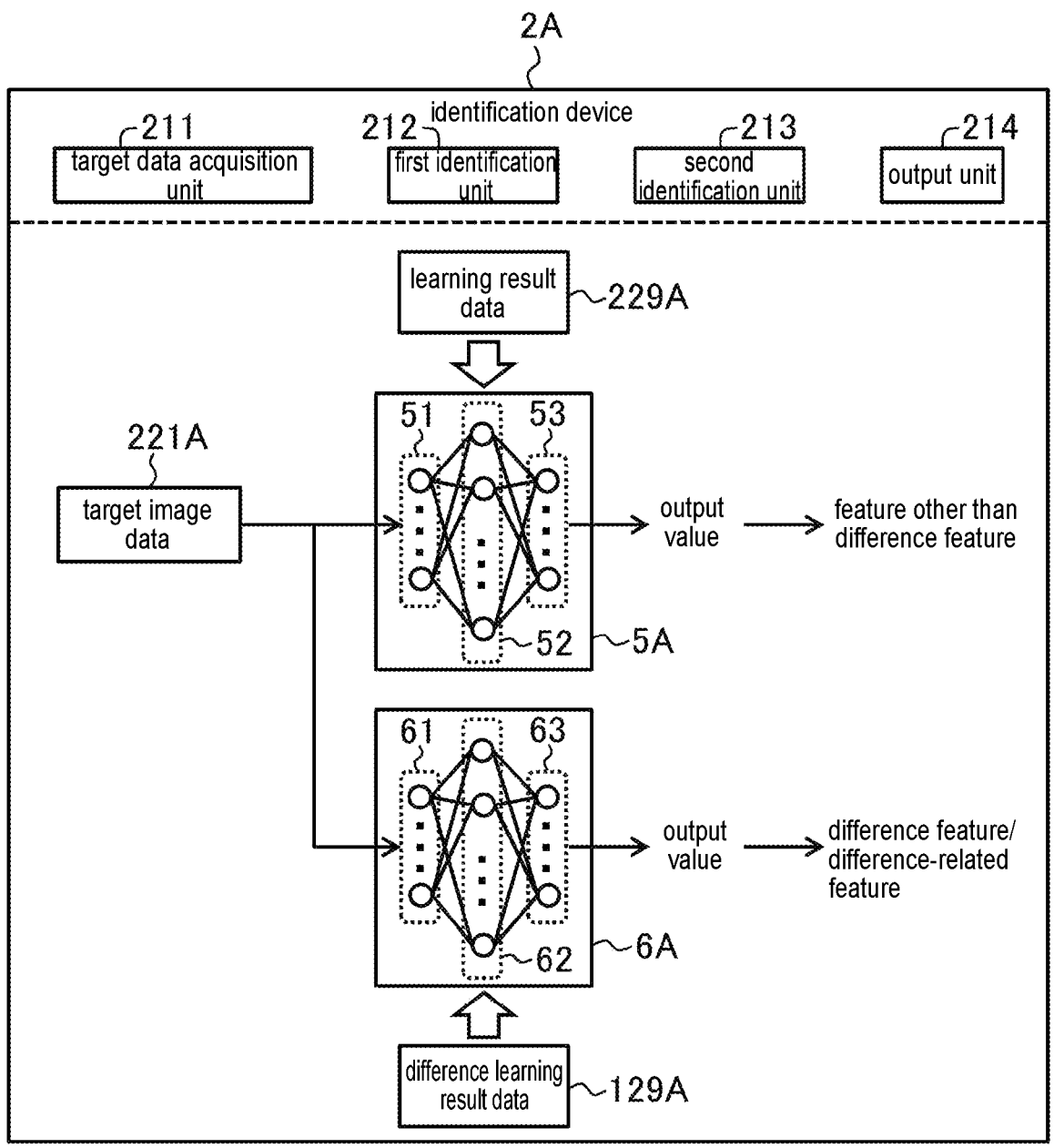
FIG. 9 schematically illustrates an example of the software configuration of an identification device according to another embodiment.

FIGS. 8 and 9 schematically illustrate an example of the software configuration of an identifier generation device 1A and an identification device 2A that configure the image identification system according to the present modification example. Except that the data to be processed is replaced with image data from the facial image data, the hardware configuration and the software configuration of the identifier generation device 1A and the identification device 2A may be the same as the hardware configuration and the software configuration of the identifier generation device 1 and the identification device 2 according to the above embodiment.

In this modification example, the feature to be identified from the image data may be appropriately determined according to the embodiment. For example, when used for recognizing an object reflected in the image data or determining the quality of a product, the feature to be identified from the image data may be the shape, the material, the surface design, or the like of the object. The feature amount (first feature amount and second feature amount) related to each feature may be the curvature of the corner of the object, the position/number/size of a convex/concave/stepped portion, the brightness, the contrast, the brightness or the change pattern of the contrast, and the like. In addition, for example, when used for character analysis, the feature to be identified from the image data may be character type, typeface, font, format, or the like. The feature amount (first feature amount and second feature amount) related to each feature may be a character width, a character size, or the like.

The first identifier 5A according to the present modification example is constructed so as to acquire the ability to identify a plurality of the above features from the image data by machine learning in which the first image data 121A is used. In addition, information indicating the configuration and the like of the first identifier 5A that has acquired the ability to identify the above features is held as learning result data 229A. The identifier generation device 1A and the identification device 2A can operate in the same processing procedure as the above embodiment. In addition, the processing of each step of the identifier generation device 1A and the identification device 2A may be executed in the same manner as in the above embodiment.

That is, in step S101, the control unit of the identifier generation device 1A operates as the first feature amount acquisition unit 111 and acquires the first image data 121A used in the machine learning for constructing the first identifier 5A. In step S102, the control unit calculates the first feature amount related to each feature from the acquired first image data 121A. Thereby, the control unit acquires the first feature amount related to each feature and calculated from the first image data 121A used in the machine learning for constructing the first identifier 5A.

In step S103, the control unit operates as the second feature amount acquisition unit 112 and acquires second image data 123A in the environment in which the first identifier 5A is used, the second image data 123A being the same type as the first image data 121A and showing a plurality of features. The second image data 123A may be selected from image data in which a plurality of features is reflected and in which at least one of the plurality of features is not identifiable or is erroneously identified by the first identifier 5A. In step S104, the control unit calculates the second feature amount related to each feature from the acquired second image data 123A. Thereby, the control unit acquires the second feature amount related to each feature and calculated from the second image data 123A.

In step S105, the control unit operates as the difference extraction unit 113, compares the first feature amount and the second feature amount for each feature and extracts, based on the result of the comparison and among the plurality of features, the feature having a size in which the difference between the first feature amount and the second feature amount satisfies a predetermined condition as a difference feature. The method of selecting the feature having a size that satisfies a predetermined condition may be the same as that in the above embodiment. For example, the predetermined condition may be defined so that one or a plurality of features is selected in order from the feature having the largest difference. In this case, the control unit may select, among the plurality of features of the subject to be identified, one or a plurality of features in order from the feature having the largest difference between the first feature amount and the second feature amount as the feature having a size that satisfies the predetermined condition, and extracts the selected one or a plurality of features as the difference feature. In addition, for example, the control unit may determine, for each feature of the subject to be identified, whether the difference between the first feature amount and the second feature amount exceeds the threshold value, and extract the feature in which the difference between the first feature amount and the second feature amount is determined to exceed the threshold value as the difference feature. As a specific example, in a case that the feature is used for object recognition, when the surface design of the target object is changed due to the difference in version, the feature related to the surface design can be extracted as the difference feature by the processing of step S105. The same applies to the case that the feature is used for quality judgment of a product.

In step S106, the control unit operates as the learning data acquisition unit 114 and acquires, in the environment in which the first identifier 5A is used, third image data 125A in which at least one of the extracted difference feature and the difference-related feature is reflected. Specifically, the control unit acquires learning data set 127A configured of pairs of the third image data 125A and correct answer data 1251A. The third image data 125A may be appropriately acquired according to at least one of the extracted difference feature and the difference-related feature. The third image data 125A may be configured of a copy of the second image data 123A or partial image data obtained by extracting, from the second image data 123A, the part in which at least one of the difference feature and the difference-related feature is reflected. In addition, the correct answer data 1251A may be appropriately created so as to indicate the correct answer to the identification of at least one of the difference feature and the difference-related feature reflected in the third image data 125A. Moreover, the difference-related feature may be appropriately selected. When the feature related to the surface design is extracted as the difference feature in step S105, the difference-related feature may be, for example, a feature related to a partial shape of a corner or the like.

In step S107, the control unit operates as the learning processing unit 115 and constructs, by machine learning in which the third image data 125A is used, a second identifier 6A which identifies at least one of the difference feature and the difference-related feature from the third image data 125A. Specifically, the control unit uses the learning data set 127A to implement the machine learning of the second identifier 6A (neural network) in order that the output value corresponding to the correct answer data 1251A is output when the third image data 125A is input. In step S108, the control unit stores the information indicating the configuration of the second identifier 6A constructed by machine learning, the weight of the connection between neurons, and the threshold value of each neuron in the storage unit as difference learning result data 129A.

On the other hand, in step S201, the control unit of the identification device 2A operates as the target data acquisition unit 211 and acquires target image data 221A that is a target for identifying a plurality of features. The target image data 221A may be appropriately acquired according to the feature to be identified.

In step S202, the control unit operates as the first identification unit 212 and refers to the learning result data 229A to set the trained first identifier 5A. Next, the control unit inputs the acquired target image data 221A to the first identifier 5A and executes the arithmetic processing of the first identifier 5A. Thereby, the control unit acquires, from the first identifier 5A, an output corresponding to the result obtained by identifying a plurality of features from the target image data 221A.

In step S203, the control unit operates as the second identification unit 213 and refers to the difference learning result data 129A to set the trained second identifier 6A. Next, the control unit inputs the acquired target image data 221A to the second identifier 6A and executes the arithmetic processing of the second identifier 6A. Thereby, the control unit acquires, from the second identifier 6A, an output corresponding to the result obtained by identifying at least one of the difference feature and the difference-related feature from the target image data 221A.

In step S204, the control unit operates as the output unit 214 and outputs the result obtained by identifying a plurality of features from the target image data 221A based on the output of the first identifier 5A and the output of the second identifier 6A. For example, the control unit may output the result obtained by identifying a feature other than the difference feature among the plurality of features based on the output of the first identifier 5A, and output the result obtained by identifying at least one of the difference feature and the difference-related feature based on the output of the second identifier 6A.

According to this modification example, for example, in a scene of object recognition, character analysis, or the like, it is possible to suppress, with a low cost method, deterioration in the performance of identifying a feature from an image caused by environmental changes. For example, when the feature is used for object recognition, the recognition precision of the target object may decrease due to differences in the manufacturer, model, or version of the target object. In contrast, according to this modification example, it is possible to extract a feature having a large variation due to the difference as the difference feature and construct a second identifier 6A which identifies at least one of the difference feature and the difference-related feature. Thereby, the target object can be recognized with relatively high precision even if there is a difference in manufacturer, model, or version. Similarly, when the feature is used in the quality judgment of the product, the quality of the product can be judged with relatively high precision.

<4.6>

The above embodiments and modification examples show examples in which the present invention is applied to a scene in which some feature is identified from image data. However, the applicable range of the present invention is not limited to the scene in which the feature is identified from image data. The present invention can be widely applied to a scene in which some feature is identified from data other than image data or multiple types of data.

Figure 10:
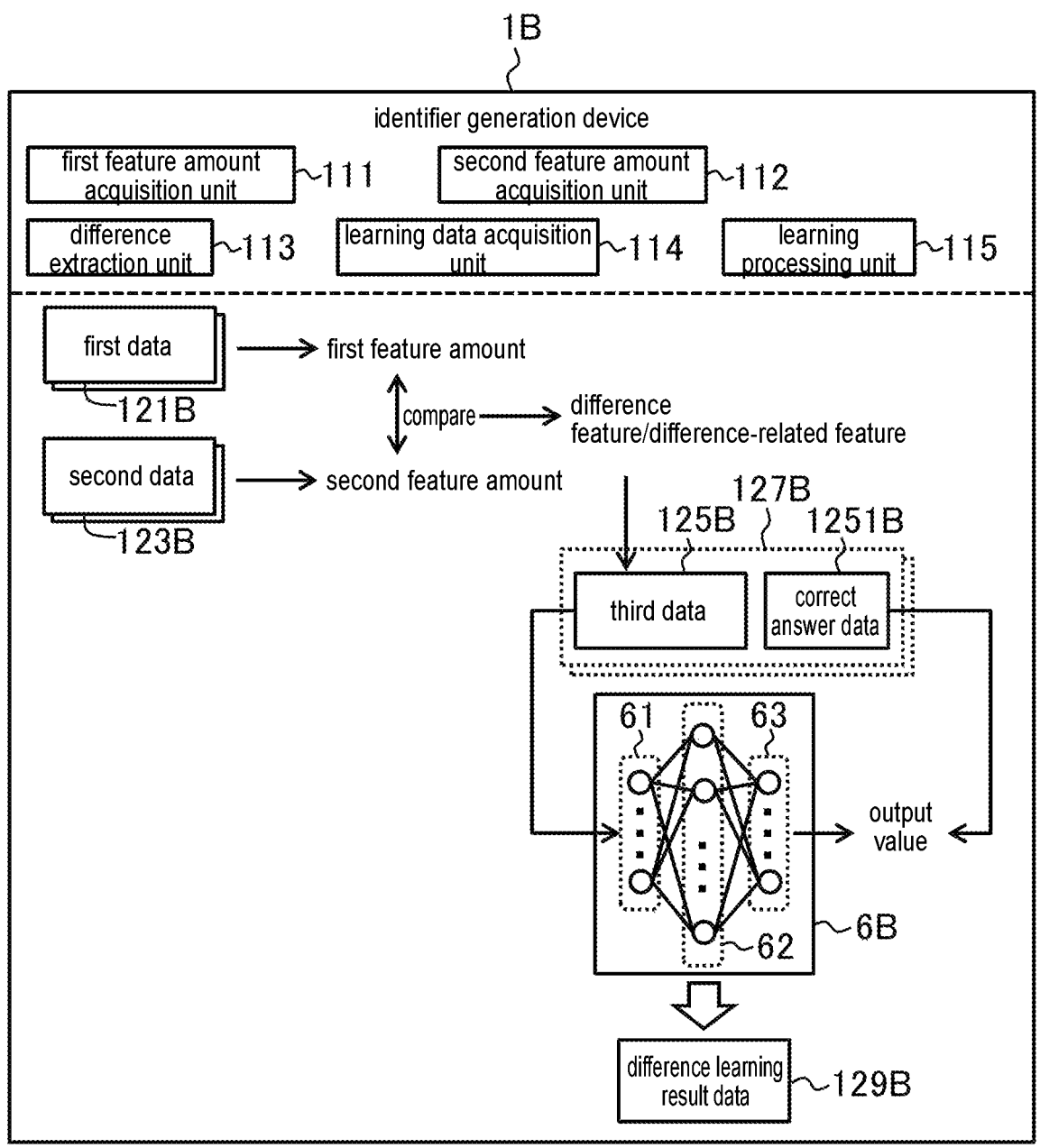
FIG. 10 schematically illustrates an example of the software configuration of an identifier generation device according to another embodiment.
Figure 11:
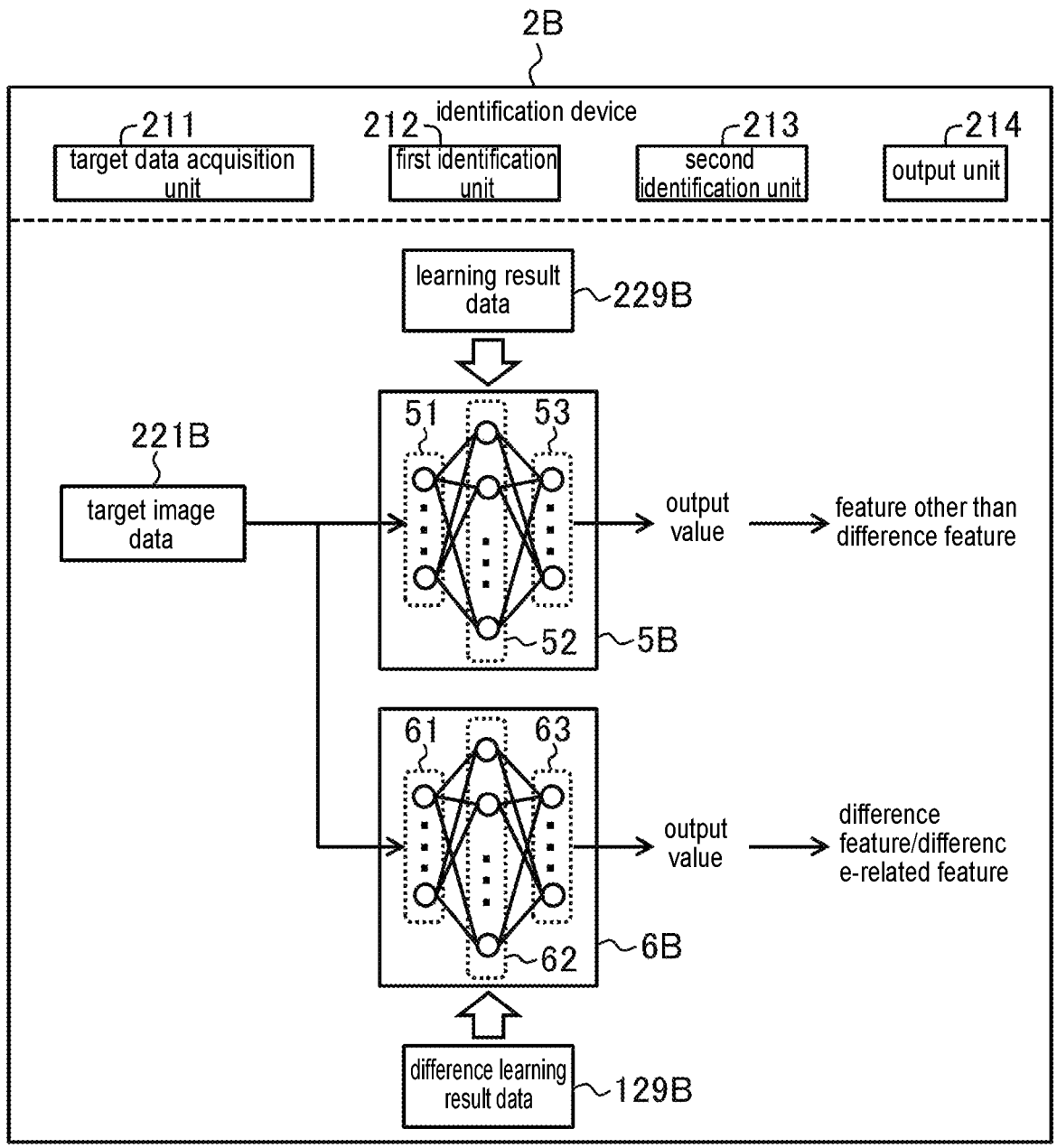
FIG. 11 schematically illustrates an example of the software configuration of an identification device according to another embodiment.

FIG. 10 and FIG. 11 schematically illustrate an example of the software configuration of an identifier generation device 1B and an identification device 2B that configure the identification system according to the present modification example. Except that the data to be processed is replaced with other types of data from the image data, the hardware configuration and the software configuration of the identifier generation device 1B and the identification device 2B may be the same as the hardware configuration and the software configuration the identifier generation device 1 and the identification device 2 according to the above embodiment.

In this modification example, the type of the data to be processed may not be particularly limited and may be appropriately determined according to the embodiment. The data to be processed may include all types of data that can be analyzed by the identifier, and may be, for example, sound data (voice data), numerical data, text data and the like in addition to image data. Furthermore, the data to be processed may be configured of a combination of multiple types of data.

In addition, the feature to be identified from the data may be appropriately determined according to the embodiment. For example, when the feature is used for voice analysis, the data to be processed may be sound data, and the feature to be identified from the sound data may be a character string of a corresponding language, tone, intonation, or the like. In addition, the feature amount (first feature amount and second feature amount) related to each feature may be a peak value, a peak-to-peak width, or the like. The plurality of features may be a series of related features such as a character string identified from voice data. In this case, the difference feature may be a part of the series of features (for example, the ending of the character string).

The first identifier 5B according to the present modification example is constructed, by machine learning in which the first data 121B is used, so as to acquire the ability to identify a plurality of the above features from the target data. In addition, information indicating the configuration and the like of the first identifier 5B that has acquired the ability to identify the above features is held as learning result data 229B. The identifier generation device 1B and the identification device 2B can operate in the same processing procedure as the above embodiment. In addition, the processing of each step of the identifier generation device 1B and the identification device 2B may be executed in the same manner as in the above embodiment.

That is, in step S101, the control unit of the identifier generation device 1B operates as the first feature amount acquisition unit 111 and acquires the first data 121B used in machine learning for constructing the first identifier 5B. When the first identifier 5B is used for voice analysis, the control unit acquires the sound data used in machine learning for voice analysis as the first data 121B. In step S102, the control unit calculates the first feature amount related to each feature from the acquired first data 121B. The method for calculating the first feature amount may be appropriately determined according to the type of the first data 121B and each feature. Thereby, the control unit acquires the first feature amount related to each feature and calculated from the first data 121B used in the machine learning for constructing the first identifier 5B.

In step S103, the control unit operates as the second feature amount acquisition unit 112 and acquires second data 123B in the environment in which the first identifier 5B is used, the second data 123B being the same type as the first data 121B and including a plurality of features. The second data 123B may be selected from data which includes a plurality of features and in which at least one of the plurality of features is not identifiable or is erroneously identified by the first identifier 5B. In step S104, the control unit calculates the second feature amount related to each feature from the acquired second data 123B. Thereby, the control unit acquires the second feature amount related to each feature and calculated from the second data 123B.

In step S105, the control unit operates as the difference extraction unit 113, compares the first feature amount and the second feature amount for each feature, and extracts, based on the result of the comparison, the feature having a size in which the difference between the first feature amount and the second feature amount satisfies a predetermined condition as the difference feature. The method of selecting the feature having a size that satisfies a predetermined condition may be the same as that in the above embodiment. For example, the predetermined condition may be defined so that one or a plurality of features is selected in order from the feature having the largest difference. In this case, the control unit may select, among the plurality of features to be identified, one or a plurality of features in order from the feature having the largest difference between the first feature amount and the second feature amount as the feature having a size that satisfies the predetermined condition, and extract the selected one or a plurality of features as the difference feature. In addition, for example, the control unit may determine, for each feature to be identified, whether the difference between the first feature amount and the second feature amount exceeds a threshold value, and may extract the feature in which the difference between the first feature amount and the second feature amount is determined to exceed the threshold value as the difference feature.

As a specific example, a scene is assumed in which there is a first region and a second region that have language systems in which only the endings are different and the other expressions are common, and the first identifier 5B constructed to perform voice analysis on the voice data collected in the first region is used in the second region. In this case, the first identifier 5B may not be capable of appropriately performing voice analysis on the ending portion of the voice data obtained in the second region, and in step S105, the feature related to the ending portion can be extracted as the difference feature.

In step S106, the control unit operates as the learning data acquisition unit 114 and acquires the third data 125B including at least one of the extracted difference feature and the difference-related feature in the scene in which the first identifier 5B is used. Specifically, the control unit acquires learning data set 127B configured of pairs of the third data 125B and correct answer data 1251B. The third data 125B may be appropriately acquired according to at least one of the extracted difference feature and the difference-related feature. The third data 125B may be configured of a copy of the second data 123B or partial data obtained by extracting the part including at least one of the difference feature and the difference-related feature from the second data 123B. In addition, the correct answer data 1251B may be appropriately created so as to indicate the correct answer to the identification of at least one of the difference feature and the difference-related feature included in the third data 125B. Moreover, the difference-related feature may be appropriately selected. When the feature related to the ending portion is extracted as the difference feature in step S105, the difference-related feature may be a feature related to the word adjacent to the ending.

In step S107, the control unit operates as the learning processing unit 115 and constructs, by machine learning in which the third data 125B is used, the second identifier 6B which identifies at least one of the difference feature and the difference-related feature from the third data 125B. Specifically, the control unit uses the learning data set 127B to execute the machine learning of the second identifier 6B (neural network) so that the output value corresponding to the correct answer data 1251B is output when the third data 125B is input. Thereby, in the case of the above example, the second identifier 6B which identifies the expression of the ending can be constructed. In step S108, the control unit stores information indicating the configuration of the second identifier 6B constructed by machine learning, the weight of connection between neurons, and the threshold value of each neuron in the storage unit as difference learning result data 129B.

On the other hand, in step S202, the control unit of the identification device 2B operates as the target data acquisition unit 211 and acquires the target data 221B that is the target for identifying a plurality of features. The target data 221B may be acquired appropriately according to the type of the data and the feature to be identified. When voice analysis is performed, for example, a microphone may be used to acquire the target data 221B.

In step S202, the control unit operates as the first identification unit 212 and refers to the learning result data 229B to set the trained first identifier 5B. Next, the control unit inputs the acquired target data 221B to the first identifier 5B, and executes the arithmetic processing of the first identifier 5B. Thereby, the control unit acquires, from the first identifier 5B, an output corresponding to the result obtained by identifying a plurality of features from the target data 221B.

In step S203, the control unit operates as the second identification unit 213 and refers to the difference learning result data 129B to set the trained second identifier 6B. Next, the control unit inputs the acquired target data 221B to the second identifier 6B and executes the arithmetic processing of the second identifier 6B. Thereby, the control unit acquires, from the second identifier 6B, an output corresponding to the result obtained by identifying at least one of the difference feature and the difference-related feature from the target data 221B.

In step S204, the control unit operates as the output unit 214 and outputs the result obtained by identifying a plurality of features from the target data 221B based on the output of the first identifier 5B and the output of the second identifier 6B. For example, the control unit may output the result obtained by identifying the feature other than the difference feature among the plurality of features based on the output of the first identifier 5B, and output the result obtained by identifying at least one of the difference feature an the difference-related feature based on the output of the second identifier 6B. In the case of the above example, the identification device 2B can identify expressions other than the expression of the ending by the first identifier 5B and the expressions of the ending by the second identifier 6B.

According to this modification example, for example, in a scene such as a voice analysis, it is possible to suppress, with a low cost method, deterioration in the performance of identifying a feature from the data caused by environmental changes.

REFERENCE SIGNS LIST

1 identifier generation device
100 facial image identification system
11 control unit
12 storage unit
13 communication interface
14 input device
15 output device
16 drive
81 generation program
91 storage medium
111 first data acquisition unit
112 second data acquisition unit
113 feature amount calculation unit
114 third data acquisition unit
115 difference extraction unit
116 learning processing unit
121 first facial image data
123 second facial image data
125 third facial image data
1251 correct answer data
127 learning data set
129 differential learning result data
2 identification device
21 control unit
22 storage unit
23 communication interface
24 external interface
25 input device
26 output device
27 drive
82 identification program
92 storage medium
211 target data acquisition unit
212 first identification unit
213 second identification unit
214 output unit
221 target facial image data
229 learning result data
31 camera
5 first identifier
51 input layer
52 intermediate layer (hidden layer)
53 output layer
6 second identifier
61 input layer
62 intermediate layer (hidden layer)
63 output layer

What is claimed is:

1. A facial image identification system, comprising:
    a first feature amount acquisition unit, which acquires a first feature amount related to each of a plurality of features and calculated from first facial image data used in machine learning for constructing a first identifier so as to identify the plurality of features of a face;
    a second feature amount acquisition unit, which acquires a second feature amount related to each of the plurality of features and calculated from second facial image data in which the plurality of features of the face is reflected, wherein the second facial image data is acquired in an environment in which the first identifier is used and the second facial image data is the same type as the first facial image data;
    a difference extraction unit, which compares the first feature amount and the second feature amount for each of the features and extracts, based on a result of a comparison and among the plurality of features, a feature having a size in which a difference between the first feature amount and the second feature amount satisfies a predetermined condition as a difference feature;
    a learning data acquisition unit, which acquires third facial image data in the environment in which the first identifier is used, wherein at least one of the difference feature and a difference-related feature that is a feature related to the difference feature is reflected in the third facial image data;
    a learning processing unit, which constructs, by machine learning in which the third facial image data is used, a second identifier that identifies at least one of the difference feature and the difference-related feature from the third facial image data;
    a target data acquisition unit, which acquires target facial image data that is a target for identifying the plurality of features;
    a first identification unit, which inputs the acquired target facial image data to the first identifier, and thereby acquires, from the first identifier, an output corresponding to a result obtained by identifying the plurality of features from the target facial image data;
    a second identification unit, which inputs the acquired target facial image data to the second identifier, and thereby acquires, from the second identifier, an output corresponding to a result obtained by identifying at least one of the difference feature and the difference-related feature from the target facial image data; and
    an output unit, which outputs, based on an output of the first identifier and an output of the second identifier, the result obtained by identifying the plurality of features from the target facial image data.

2. The facial image identification system according to claim 1, wherein the third facial image data is configured of a copy of the second facial image data or partial facial image data obtained by extracting, from the second facial image data, a part in which at least one of the difference feature and the difference-related feature is reflected.

3. The facial image identification system according to claim 1, wherein the second facial image data is selected from facial image data in which the plurality of features is reflected and in which at least one of the plurality of features is not identifiable or is erroneously identified by the first identifier.

4. The facial image identification system according to claim 1, wherein the plurality of features of the face is selected from types of facial expression, a position of a facial part, a shape of a facial part, a color of a facial part, and a state of a facial part.

5. The facial image identification system according to claim 1, wherein the output unit outputs a result obtained by identifying the feature of the face other than the difference feature among the plurality of features based on the output of the first identifier, and outputs the result obtained by identifying at least one of the difference feature and the difference-related feature based on the output of the second identifier.

6. The facial image identification system according to claim 1, wherein the predetermined condition is defined so that one or the plurality of features is selected in order from the feature having a largest difference, and
the difference extraction unit selects one or the plurality of features in order from the feature having a largest difference between the first feature amount and the second feature amount, and extracts the selected one or the plurality of features as the difference feature.

7. The facial image identification system according to claim 1, wherein the predetermined condition is defined so that a feature in which a difference exceeds a threshold value is selected, and
the difference extraction unit determines whether the difference between the first feature amount and the second feature amount exceeds the threshold value, and extracts the feature in which the difference between the first feature amount and the second feature amount is determined to exceed the threshold value as the difference feature.

8. An identifier generation device, comprising:
a first feature amount acquisition unit, which acquires a first feature amount related to each of a plurality of features and calculated from first facial image data used in machine learning for constructing a first identifier so as to identify the plurality of features of a face;
a second feature amount acquisition unit, which acquires a second feature amount related to each of the plurality of features and calculated from second facial image data in which the plurality of features of the face is reflected, wherein the second facial image data is acquired in an environment in which the first identifier is used and the second facial image data is the same type as the first facial image data;
a difference extraction unit, which compares the first feature amount and the second feature amount for each of the features and extracts, based on a result of a comparison and among the plurality of features, a feature having a size in which a difference between the first feature amount and the second feature amount satisfies a predetermined condition as a difference feature;
a learning data acquisition unit, which acquires third facial image data in the environment in which the first identifier is used, wherein at least one of the difference feature and a difference-related feature that is a feature related to the difference feature is reflected in the third facial image data; and
a learning processing unit, which constructs, by machine learning in which the third facial image data is used, a second identifier that identifies at least one of the difference feature and the difference-related feature from the third facial image data.

9. An image identification system, comprising:
a first feature amount acquisition unit, which acquires a first feature amount related to each of a plurality of features and calculated from first image data used in machine learning for constructing a first identifier so as to identify the plurality of features, wherein the plurality of features is captured in the first image data;
a second feature amount acquisition unit, which acquires a second feature amount related to each of the plurality of features and calculated from second image data in which the plurality of features is reflected, wherein the second image data is acquired in an environment in which the first identifier is used and the second image data is the same type as the first image data;
a difference extraction unit, which compares the first feature amount and the second feature amount for each of the features and extracts, based on a result of a comparison and among the plurality of features, a feature having a size in which a difference between the first feature amount and the second feature amount satisfies a predetermined condition as a difference feature;
a learning data acquisition unit, which acquires third image data in the environment in which the first identifier is used, wherein at least one of the extracted difference feature and a difference-related feature that is a feature related to the difference feature is reflected in the third image data;
a learning processing unit, which constructs, by machine learning in which the third image data is used, a second identifier that identifies at least one of the difference feature and the difference-related feature from the third image data;
a target data acquisition unit, which acquires target image data that is a target for identifying the plurality of features;
a first identification unit, which inputs the acquired target image data to the first identifier, and thereby acquires, from the first identifier, an output corresponding to a result obtained by identifying the plurality of features from the target image data;
a second identification unit, which inputs the acquired target image data to the second identifier, and thereby acquires, from the second identifier, an output corresponding to a result obtained by identifying at least one of the difference feature and the difference-related feature from the target image data; and
an output unit, which outputs, based on an output of the first identifier and an output of the second identifier, the result obtained by identifying the plurality of features from the target image data.

10. An identifier generation device, comprising:
a first feature amount acquisition unit, which acquires a first feature amount related to each of a plurality of features and calculated from first image data used in machine learning for constructing a first identifier so as to identify the plurality of features, wherein the plurality of features is reflected in the first image data;
a second feature amount acquisition unit, which acquires a second feature amount related to each the plurality of features and calculated from second image data in which the plurality of features is reflected, wherein the second image data is acquired in an environment in which the first identifier is used and the second image data is the same type as the first image data;
a difference extraction unit, which compares the first feature amount and the second feature amount for each of the features and extracts, based on a result of a comparison and among the plurality of features, a feature having a size in which a difference between the first feature amount and the second feature amount satisfies a predetermined condition as a difference feature;
a learning data acquisition unit, which acquires third image data in the environment in which the first identifier is used, wherein at least one of the extracted difference feature and a difference-related feature that is a feature related to the difference feature is reflected in the third image data; and
a learning processing unit, which constructs, by machine learning in which the third image data is used, a second identifier that identifies at least one of the difference feature and the difference-related feature from the third image data.

11. An identification system, comprising:
a first feature amount acquisition unit, which acquires a first feature amount related to each of a plurality of features and calculated from first data used in machine learning for constructing a first identifier so as to identify the plurality of features, wherein the plurality of features is included in the first data;
a second feature amount acquisition unit, which acquires a second feature amount related to each of the plurality of features and calculated from second data in which the plurality of features is included, wherein the second data is acquired in an environment in which the first identifier is used and the second data is the same type as the first data;
a difference extraction unit, which compares the first feature amount and the second feature amount for each of the features and extracts, based on a result of a comparison and among the plurality of features, a feature having a size in which the difference between the first feature amount and the second feature amount satisfies a predetermined condition as a difference feature;
a learning data acquisition unit, which acquires third data in the environment in which the first identifier is used, wherein at least one of the extracted difference feature and a difference-related feature that is a feature related to the difference feature is included in the third data;
a learning processing unit, which constructs, by machine learning in which the third data is used, a second identifier that identifies at least one of the difference feature and the difference-related feature from the third data;
a target data acquisition unit, which acquires target data that is a target for identifying the plurality of features;
a first identification unit, which inputs the acquired target data to the first identifier, and thereby acquires, from the first identifier, an output corresponding to a result obtained by identifying the plurality of features from the target data;
a second identification unit, which inputs the acquired target data to the second identifier, and thereby acquires, from the second identifier, an output corresponding to a result obtained by identifying at least one of the difference feature and the difference-related feature from the target data; and
an output unit, which outputs, based on an output of the first identifier and an output of the second identifier, the result obtained by identifying the plurality of features from the target data.

12. The identification system according to claim 11, wherein the third data is configured of a copy of the second data or partial data obtained by extracting, from the second data, a part in which at least one of the difference feature and the difference-related feature is included.

13. The identification system according to claim 11, wherein the second data is selected from data in which the plurality of features is included and in which at least one of the plurality of features is not identifiable or is erroneously identified by the first identifier.

14. The identification system according to claim 11, wherein the output unit outputs a result obtained by identifying the feature other than the difference feature among the plurality of features based on the output of the first identifier, and outputs the result obtained by identifying at least one of the difference feature and the difference-related feature based on the output of the second identifier.

15. The identification system according to claim 11, wherein the predetermined condition is defined so that one or the plurality of features is selected in order from the feature having a largest difference, and
the difference extraction unit selects one or the plurality of features in order from the feature having a largest difference between the first feature amount and the second feature amount, and extracts the selected one or the plurality of features as the difference feature.

16. The identification system according to claim 11, wherein the predetermined condition is defined so that a feature in which a difference exceeds a threshold value is selected, and
the difference extraction unit determines whether the difference between the first feature amount and the second feature amount exceeds the threshold value, and extracts the feature in which the difference between the first feature amount and the second feature amount is determined to exceed the threshold value as the difference feature.

17. An identifier generation device, comprising:
a first feature amount acquisition unit, which acquires a first feature amount related to each of a plurality of features and calculated from first data used in machine learning for constructing a first identifier so as to identify the plurality of features, wherein the plurality of features is included in the first data;
a second feature amount acquisition unit, which acquires a second feature amount related to each of the plurality of features and calculated from second data in which the plurality of features is included, wherein the second data is acquired in an environment in which the first identifier is used and the second data is the same type as the first data;

a difference extraction unit, which compares the first feature amount and the second feature amount for each of the features and extracts, based on a result of a comparison among the plurality of features, a feature having a size in which the difference between the first feature amount and the second feature amount satisfies a predetermined condition as a difference feature;

a learning data acquisition unit, which acquires third data in the environment in which the first identifier is used, wherein at least one of the extracted difference feature and a difference-related feature that is a feature related to the difference feature is included in the third data;

a learning processing unit, which constructs, by machine learning in which the third data is used, a second identifier that identifies at least one of the difference feature and the difference-related feature from the third data.

\* \* \* \* \*